(12) United States Patent
Ellis et al.

(10) Patent No.: US 10,598,203 B2
(45) Date of Patent: *Mar. 24, 2020

(54) FUNCTIONAL ELEMENT FOR A FLUID-TIGHT ATTACHMENT TO A SHEET METAL PART, COMPONENT ASSEMBLY AND METHOD

(71) Applicant: PROFIL Verbindungstechnik GmbH & Co. KG, Friedrichsdorf (DE)

(72) Inventors: Adrian Ellis, Rayleigh (GB); Richard Humpert, Bad Nauheim (DE)

(73) Assignee: PROFIL Verbindungstechnik GmbH & Co. KG (DE)

( * ) Notice: Subject to any disclaimer, the term of this patent is extended or adjusted under 35 U.S.C. 154(b) by 191 days.

This patent is subject to a terminal disclaimer.

(21) Appl. No.: 15/730,644

(22) Filed: Oct. 11, 2017

(65) Prior Publication Data

US 2018/0100528 A1 Apr. 12, 2018

(30) Foreign Application Priority Data

Oct. 12, 2016 (DE) .......................... 10 2016 119 479

(51) Int. Cl.
*F16B 39/08* (2006.01)
*F16B 19/08* (2006.01)
(Continued)

(52) U.S. Cl.
CPC .............. *F16B 19/08* (2013.01); *B21J 15/06* (2013.01); *F16B 37/065* (2013.01); *F16B 37/068* (2013.01)

(58) Field of Classification Search
CPC .. F16B 5/04; F16B 19/04; F16B 19/08; F16B 19/086; F16B 37/044; F16B 37/045;
(Continued)

(56) References Cited

U.S. PATENT DOCUMENTS 4,430,034 A * 2/1984 Fujikawa .............. B23P 19/062
29/432
4,802,803 A * 2/1989 Muller .................. B23P 19/062
29/512
(Continued)

FOREIGN PATENT DOCUMENTS

DE 102006028537 B3 5/2007
DE 102013218605 A1 3/2015
EP 2631498 A1 8/2013

OTHER PUBLICATIONS

German Research Report from the Germany Patent Office; DE Application No. 102016119479.4; dated May 11, 2017; 2 pages.

*Primary Examiner* — Roberta S Delisle
(74) *Attorney, Agent, or Firm* — Dickinson Wright PLLC

(57) ABSTRACT

A functional element having a section that has a flange, that projects away from a side of the flange, and is adapted for an aperture-free punching into a sheet metal part and having a shaft part that projects away from a side of the flange opposite the first side, that satisfies a function and that is provided with a longitudinal axis. The flange and the section are arranged at least substantially coaxially to the shaft part. The section is formed as a hollow cylinder that has notches extending in parallel with the longitudinal direction at at least one of its outer jacket surface and its inner jacket surface. The section has a diverging frustoconical shape that runs out at least substantially at the free end at the inner side of the section in the region of its free end and that serves for the widening of the section on the punching in the sheet metal part. A component assembly and a method of producing the latter is also claimed.

13 Claims, 18 Drawing Sheets

(51) Int. Cl.
*F16B 37/06* (2006.01)
*B21J 15/06* (2006.01)

(58) Field of Classification Search
CPC ...... F16B 37/048; F16B 37/06; F16B 37/065; F16B 37/068; B21J 15/06
USPC ................ 411/176–177, 181, 183, 500–501; 428/99
See application file for complete search history.

(56) References Cited

U.S. PATENT DOCUMENTS

| | | | | |
|---|---|---|---|---|
| 5,020,950 | A * | 6/1991 | Ladouceur | F16B 37/062 411/107 |
| 6,108,893 | A * | 8/2000 | Wojciechowski | B23P 19/062 29/432.1 |
| 6,146,072 | A * | 11/2000 | Muller | B23P 19/062 411/176 |
| 6,802,682 | B2 * | 10/2004 | Stevenson | F16B 5/04 29/525.06 |
| 6,814,531 | B2 * | 11/2004 | Stevenson | F16B 19/086 411/179 |
| 7,032,296 | B2 * | 4/2006 | Zdravkovic | B21J 15/025 29/243.53 |
| 7,287,944 | B2 * | 10/2007 | Ladouceur | B23P 19/062 29/512 |
| 9,157,464 | B2 * | 10/2015 | Ellis | B21J 15/025 |

\* cited by examiner

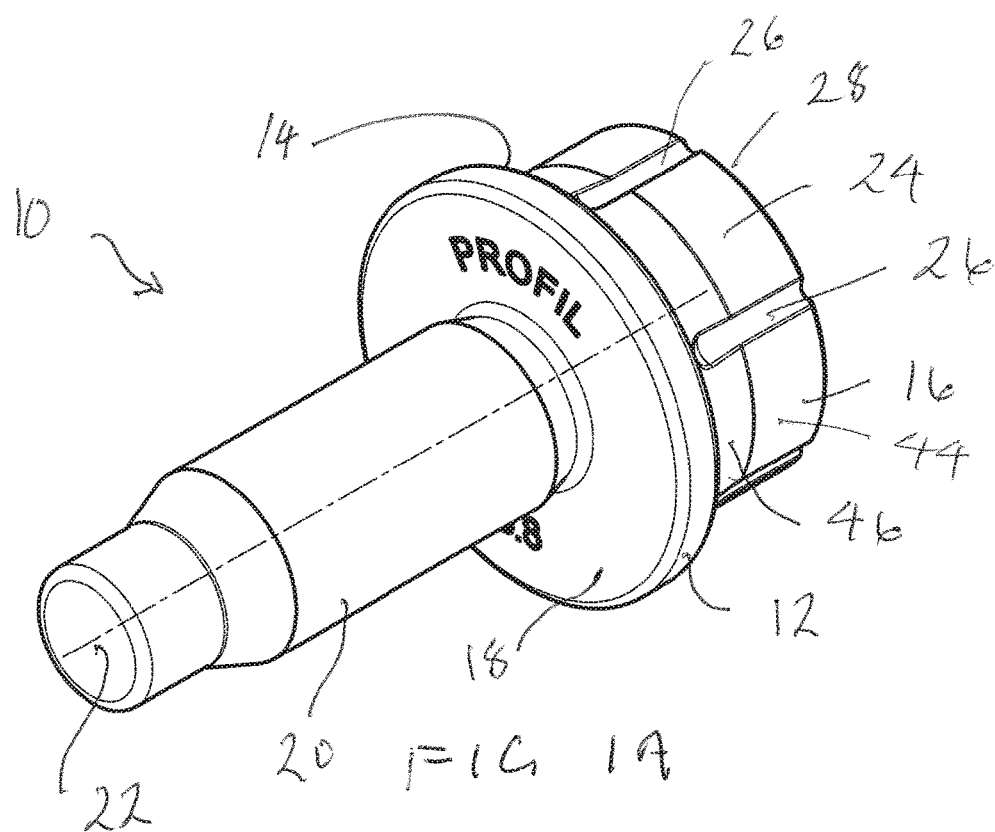
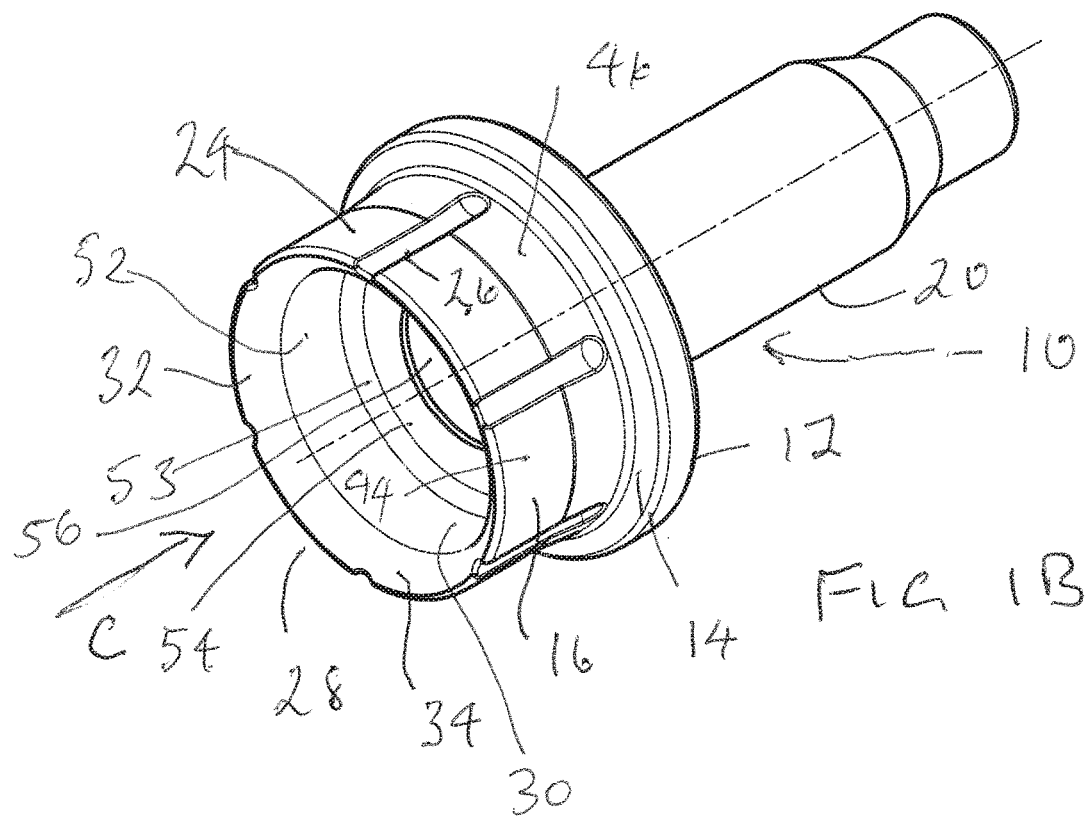

Figure 6A:
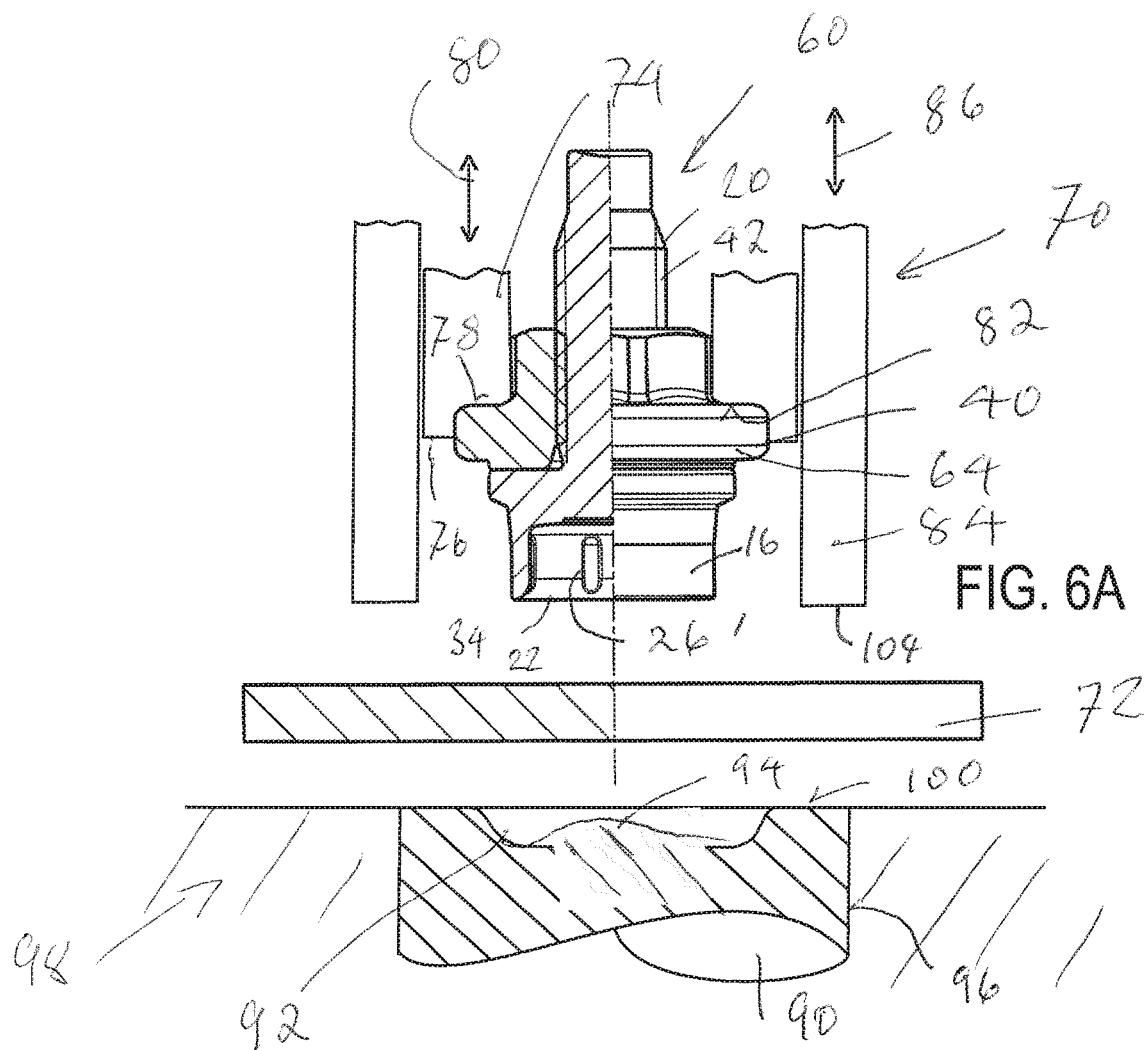
Figure 6B:
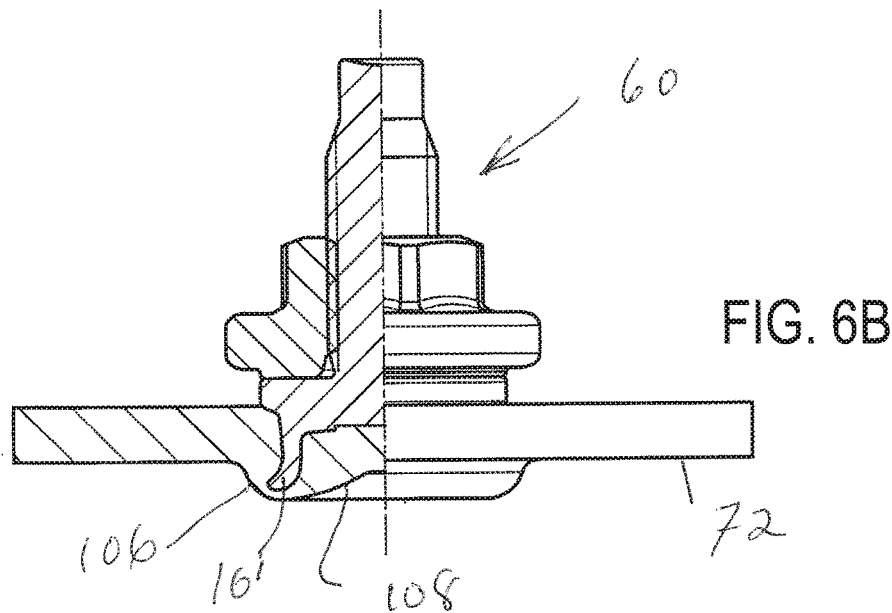
Figure 7A:
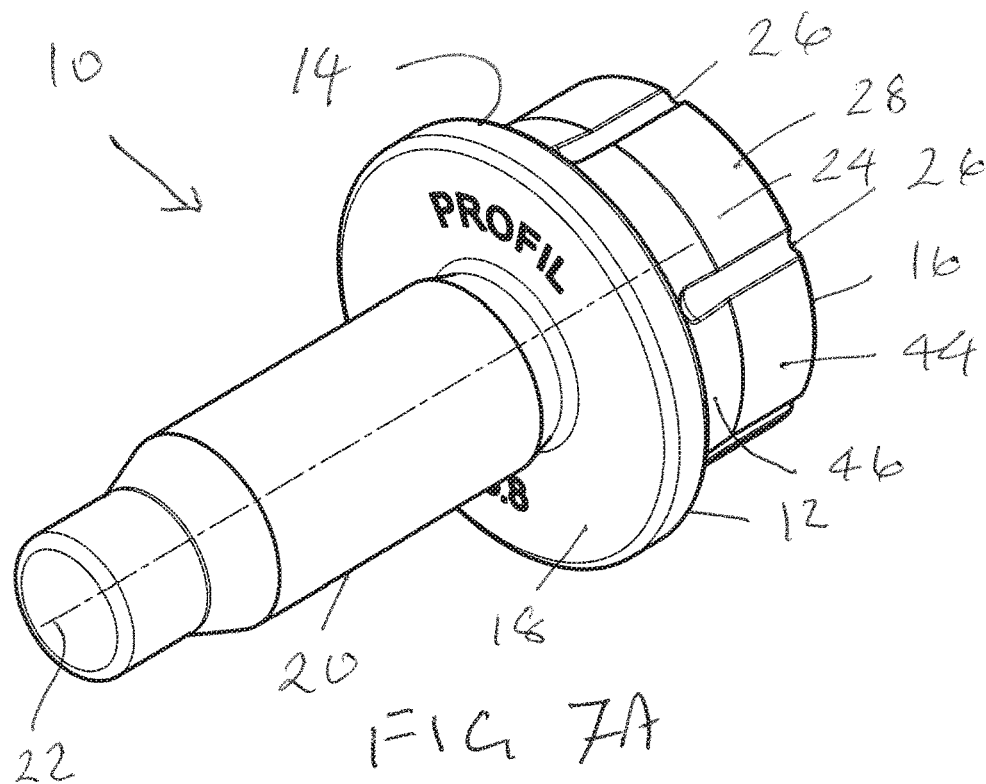
Figure 7B:
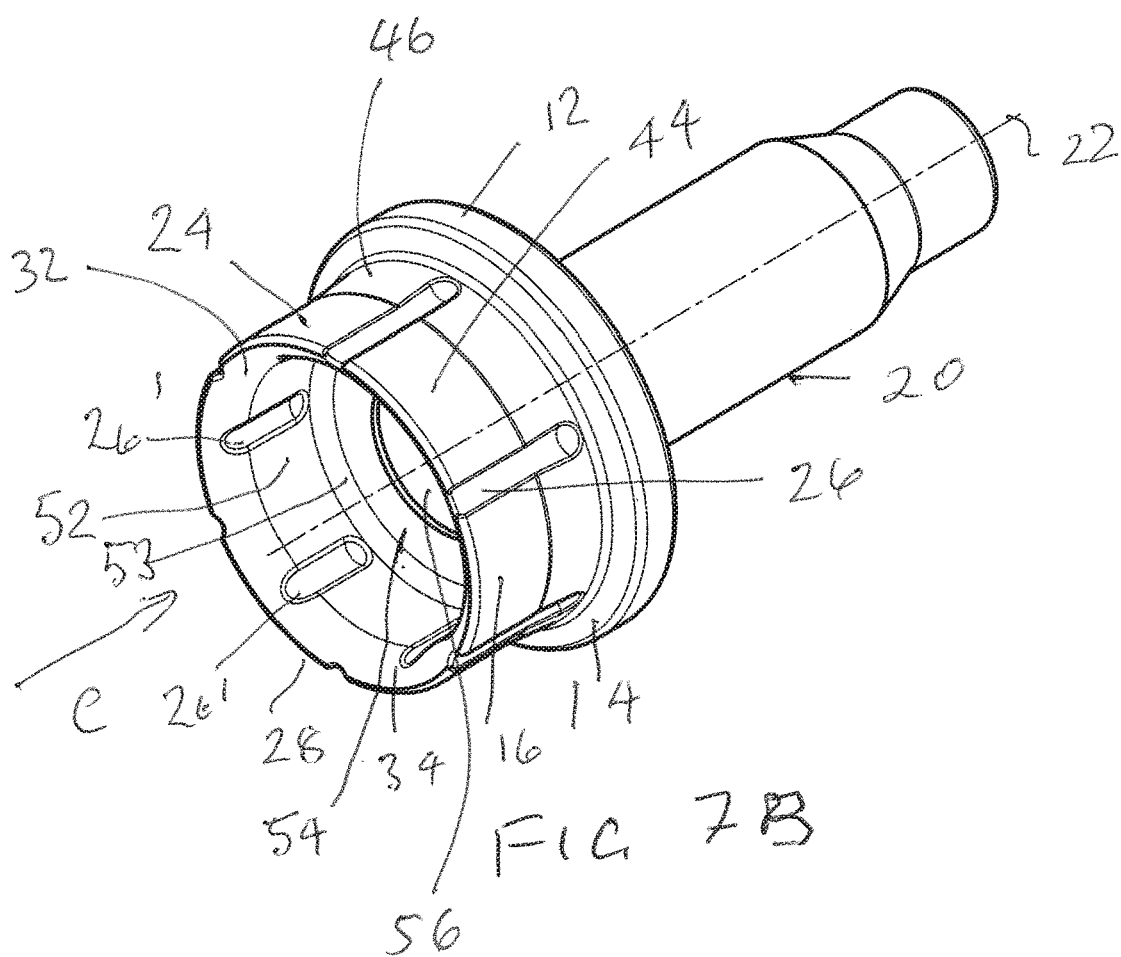
Figure 7C:
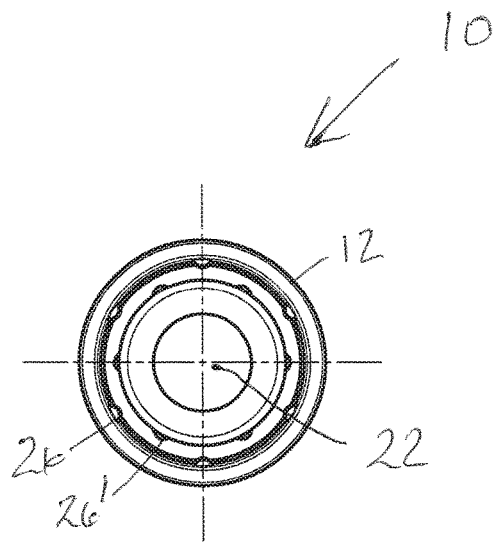
Figure 7D:
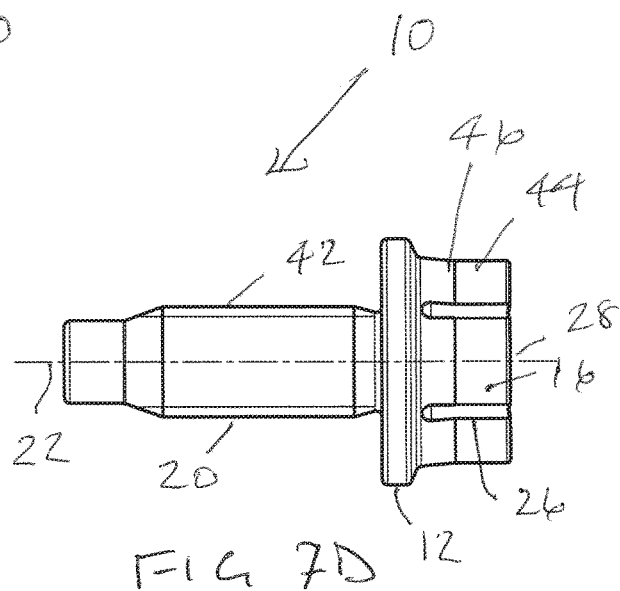
Figure 7E:
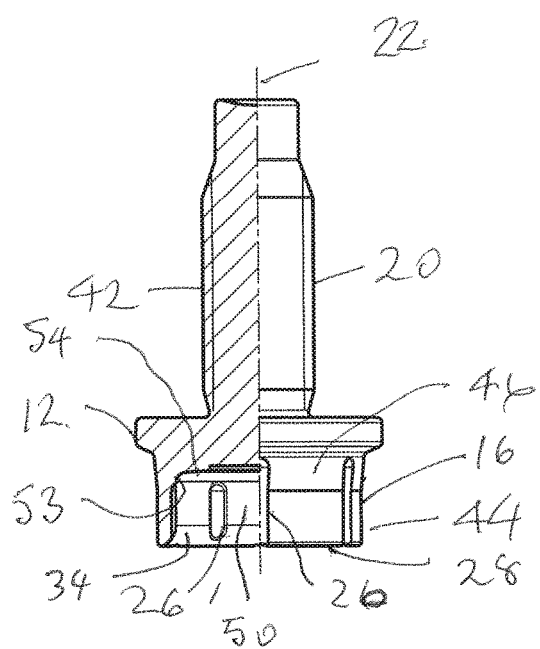
Figure 8A:
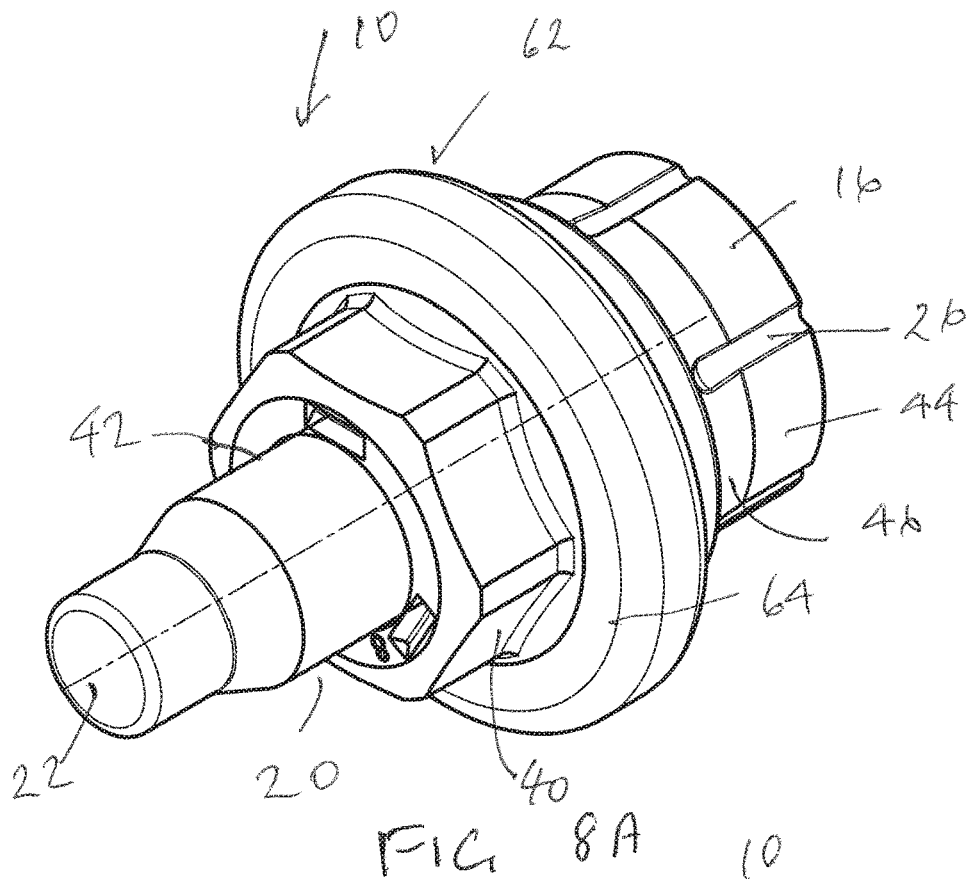
Figure 8B:
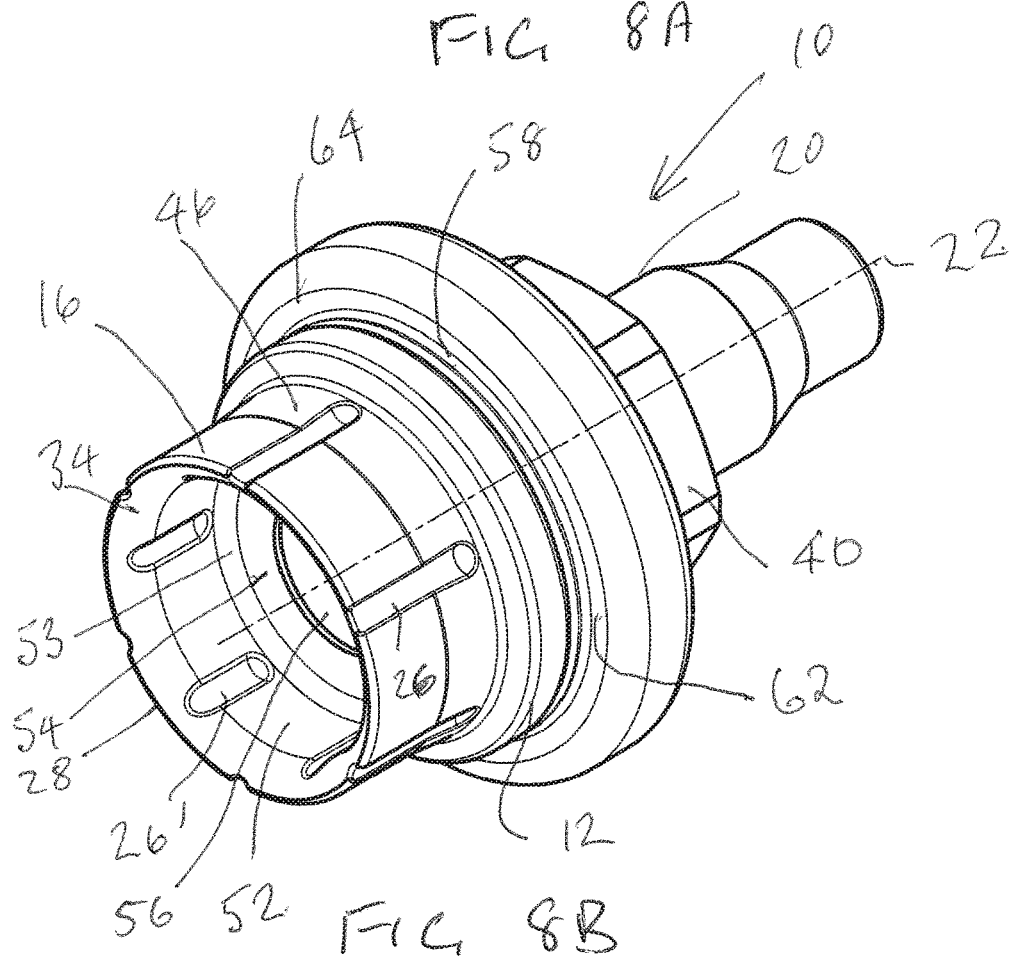
Figure 8C:
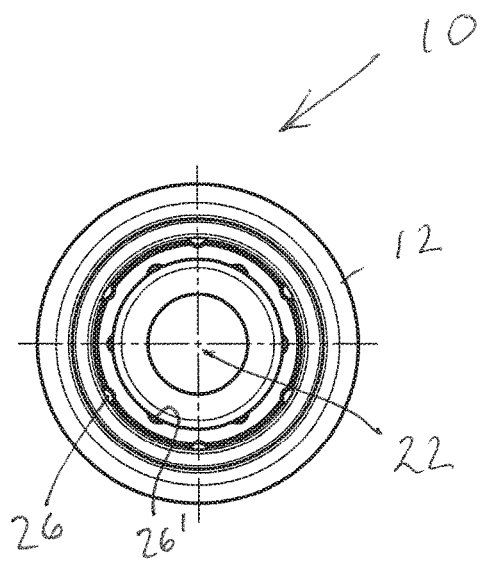
Figure 8D:
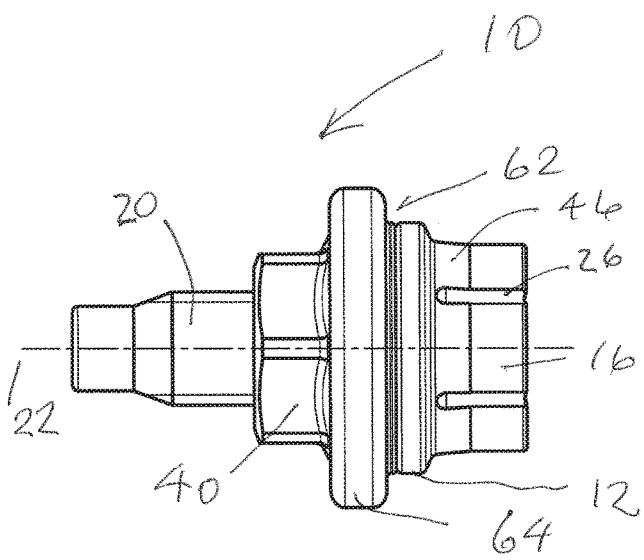
Figure 8E:
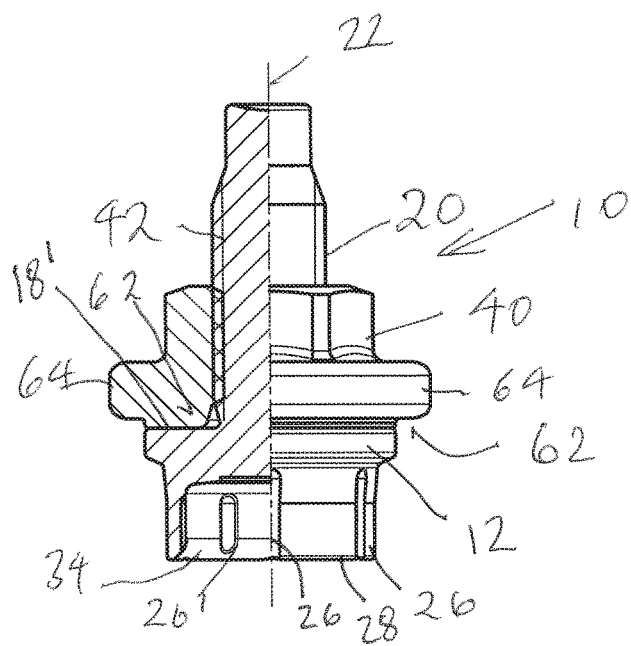

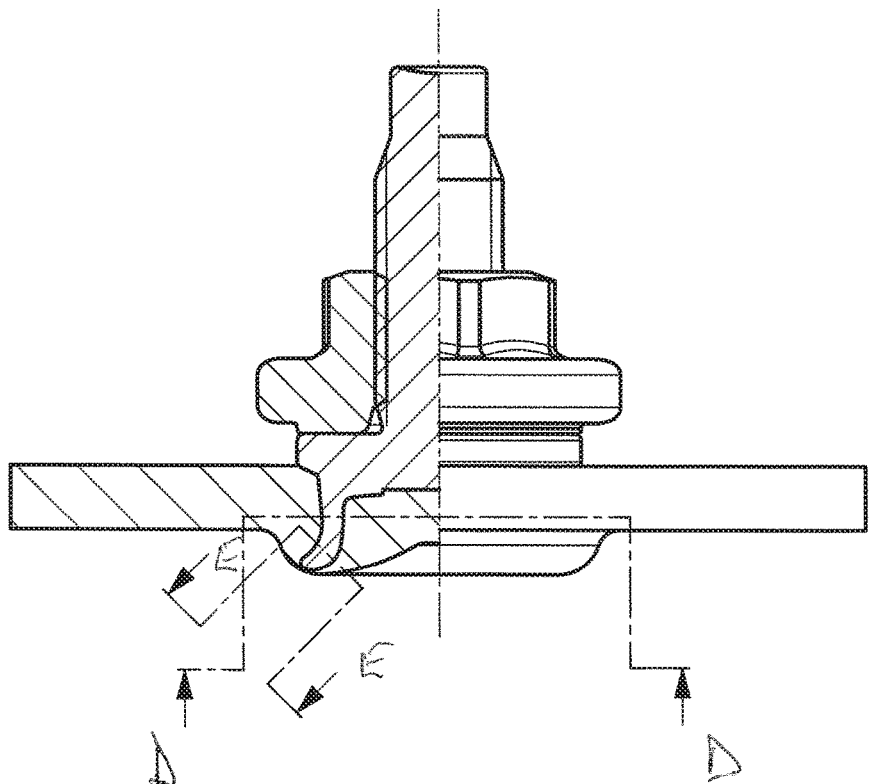
FIG 6C
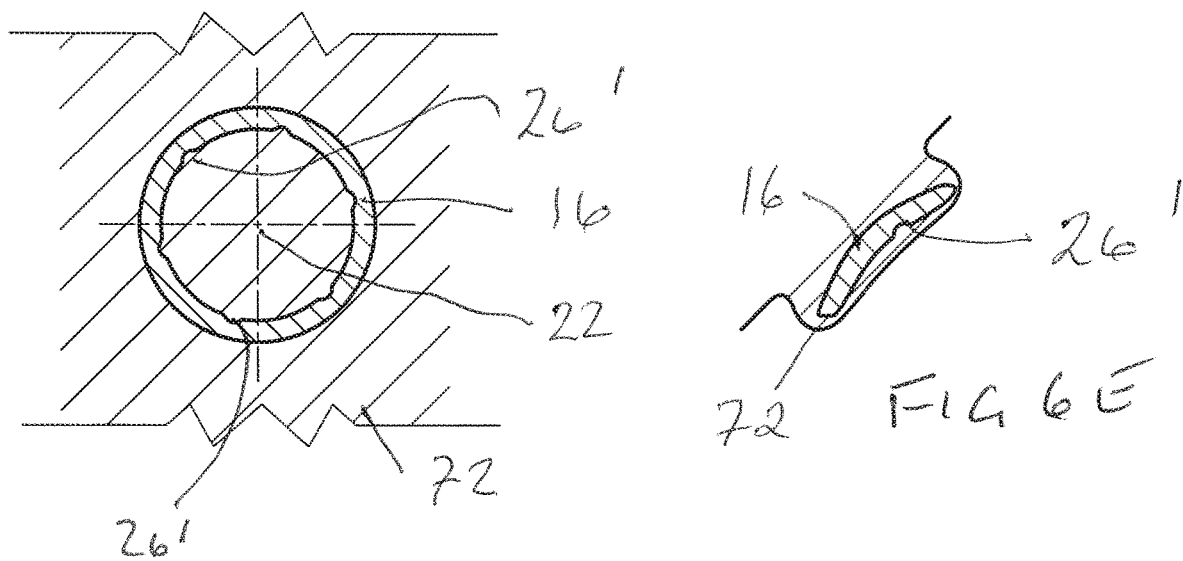
FIG 6D
FIG 6E

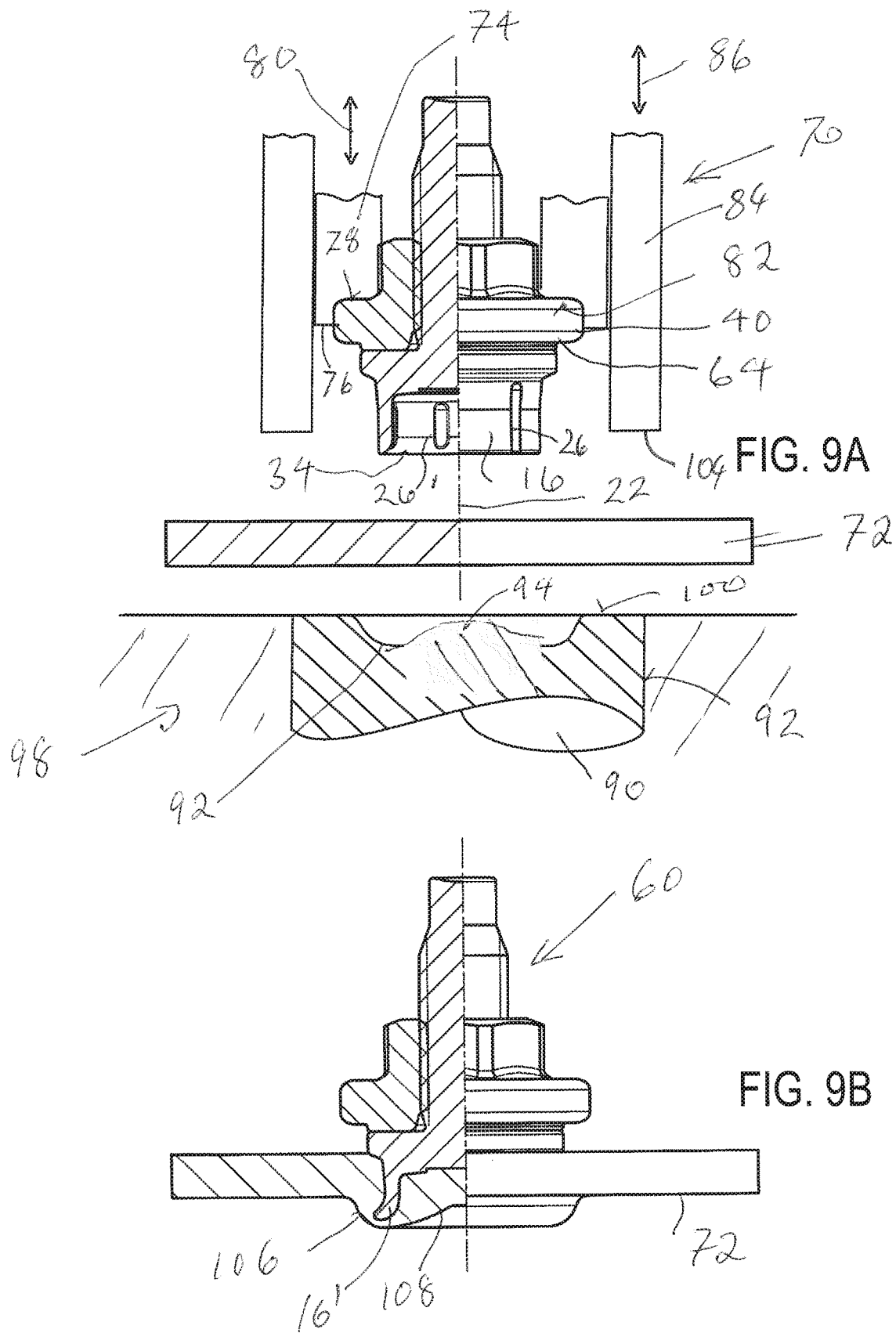

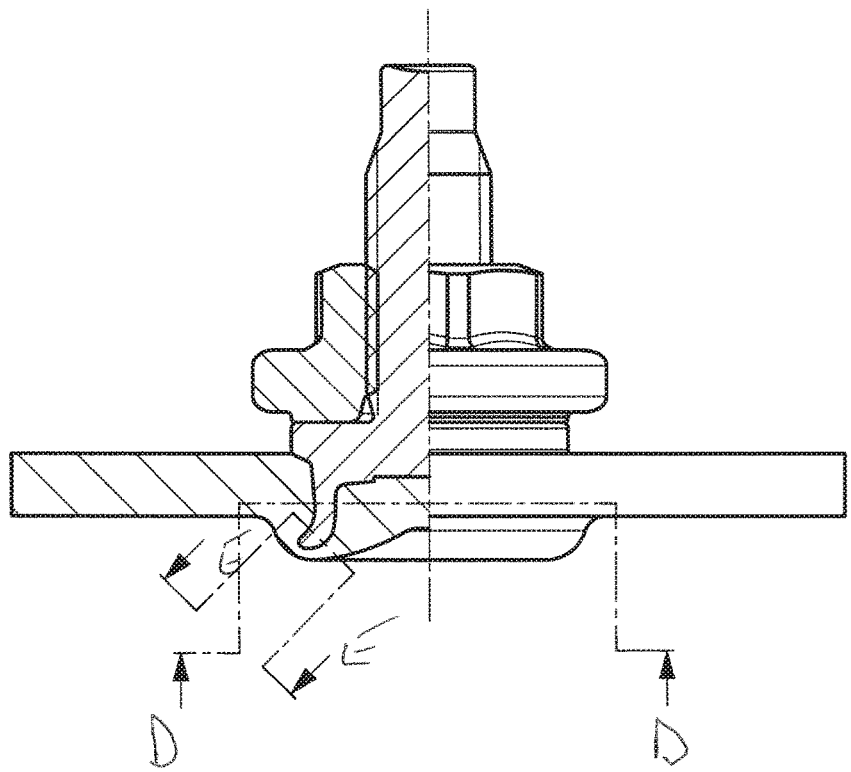
FIG 9C
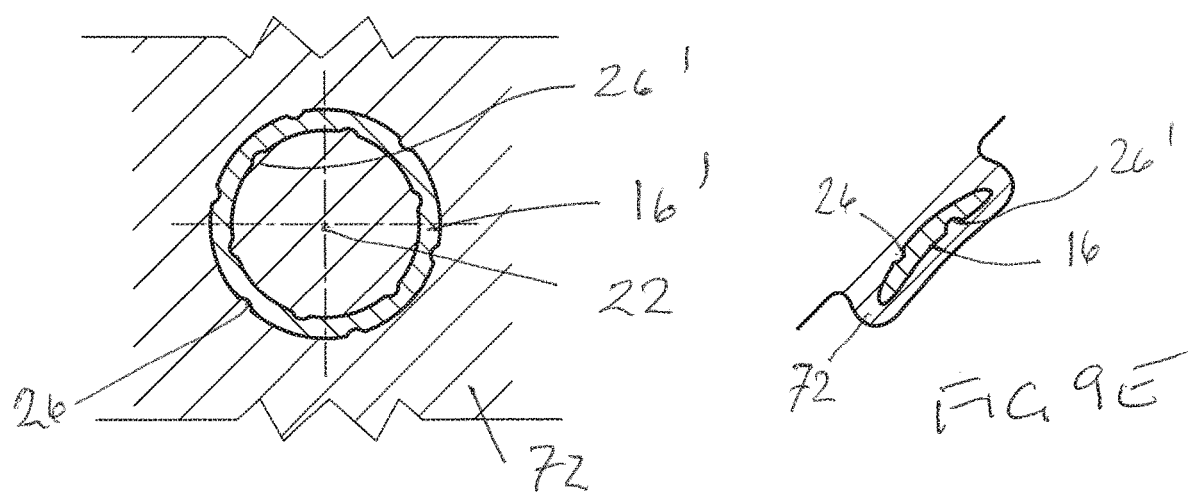
FIG 9D
FIG 9E

FUNCTIONAL ELEMENT FOR A FLUID-TIGHT ATTACHMENT TO A SHEET METAL PART, COMPONENT ASSEMBLY AND METHOD

The present invention relates to a functional element for a fluid-tight attachment to a sheet metal part, to a component assembly comprising the functional element and the sheet metal part, and to a method for manufacturing such a component assembly.

The underlying object of the invention comprises providing a functional element and a component assembly as well as a method for manufacturing a component assembly that can be manufactured and implemented inexpensively and that in particular enables a fluid-tight attachment of the head part of the functional element to a single sheet metal part and a fluid-tight component assembly, wherein the shaft part of the functional element can be adapted for carrying out a plurality of functions, and wherein particularly high demands can be made on the security against rotation of the connection to the sheet metal part.

In accordance with the invention, a functional element having a section that has a flange, that projects away from a side of the flange, and that is adapted for an aperture-free punching into a sheet metal part and having a shaft part that projects away from a side of the flange opposite the first side, that satisfies a function, and that has a longitudinal axis, wherein the flange and the section are arranged at least substantially coaxially to the shaft part, wherein the section is configured as a hollow cylinder that has notches extending in parallel with the longitudinal direction at at least one if its outer jacket surface and its inner jacket surface and the section has a diverging frustoconical shape that runs out at least substantially at the free end and that serves for the widening of the section on the punching into the sheet metal part in the region of its free front end on the inner side preferably in a region directly adjacent to the free end of the section.

The present invention thus relates to a further development of the functional element of the assembly component and also of the method in accordance with EP 2 631 498 B in which the security against rotation ribs are replaced with notches. It has surprisingly been found that the use of notches instead of ribs results in an increased security against rotation that is at least twenty percent higher than with comparable functional elements having ribs instead of notches. The notches provided in accordance with the invention can be provided either outwardly in the outer cylindrical jacket surface of the cylindrical section or on the inner jacket surface of the cylindrical section or both in the outer jacket surface and in the inner jacket surface. The notches preferably have a shape that is rounded in cross-section and that in particular corresponds to a semicircular cross-section.

Such a functional element thus has a head part that comprises the flange and the named section, that is admittedly formed approximately similar to or the same as a half-hollow piercing rivet and can therefore be manufactured inexpensively, but that differs in a plurality of aspects from a hall hollow piercing rivet. Piercing rivets are namely used for connecting two sheet metal parts to one another and have the result that at least the one sheet metal part is pierced. It is therefore not possible to speak of a fluid-tight connection. Furthermore, piercing rivets only have the function of fastening two sheet metal parts to one another, while in accordance with the invention only one sheet metal part that may not be pierced is to be used. The element in accordance with the invention furthermore has a different function than the connection of two sheet metal parts.

The component assembly in accordance with the invention comprises a sheet metal part and the functional element in accordance with the invention and is adapted such that the sheet meal part has a thickened portion in the region of the attached functional element in comparison with the metal sheet thickness radially outside the attached functional element, such that the named section is received in widened form with shape matching in the region of the thickened portion and at the free end without penetrating the sheet metal part, and such that the sheet metal material is in engagement with the widened section both outside the widened section and within it as well as in engagement with the notches, whether they are outside or inside the widened section or both outside and inside this section.

The method in accordance with the invention for manufacturing the component assembly by punching the functional element into the sheet metal part comprises the following steps:

arranging the sheet metal part on a die button having a central recess, wherein the size of the opening of the recess determines the size or the diameter of the thickened portion and the die button preferably has a central elevated portion within the recess;

pressing the functional element with the free end of the section at the front toward the side of the sheet metal part remote from the die button and pressing the section into the sheet metal material, whereby the diverging frustoconical shape of the section is optionally widened in combination with a central elevated portion of the recess of the die button;

displacing the sheet metal material by the named section using the punching forces into the recess of the die button and forming the named thickened portion and optionally a centrally arranged indentation of the thickened portion, with the sheet metal material being brought into engagement with the outer and inner jacket surfaces of the named section and in engagement with any notches provided there; and optionally, partly pressing the side of the flange facing the section plus any features providing security against rotation present there into the side of the sheet metal part remote from the die button.

The functional element in accordance with the invention or the new fastening method is intended respectively as or for bolts such as a grounding bolt. The method in accordance with the invention deals with the attachment of a further developed half hollow piercing rivet having a special function and having additional features providing security against rotation. The method is mainly usable for sheet metal thicknesses above 2.5 mm. The sheet metal on which the bolts are fixed is not pierced so that the leak tightness is generally present. The geometry of the bolt can be designed such that the torque, press-out forces and button-out forces as well as the security against rotation value are relatively high. Since this property profile matches the demands on a grounding bolt relatively well, a grounding bolt is assumed for some of the embodiment drawings in the description of the Figures.

The functional element in accordance with the invention or component assembly can, however, be adapted for the following kinds of functions, for example. It can be used for the attachment of a connection terminal or of a nut for fastening a connection terminal. In this case, the shaft part is provided with a male thread or a with a thread-like design. The forces that are to be applied are the torques that are necessary for the tightening or releasing of the nut from the functional element attached to the sheet metal part for clamping the connection terminal and any normally smaller forces which can arise from the cables connected to the connection terminal. The fluid-tight and in particular water-tight connection to the sheet metal part is of significance because it protects against corrosion in the region of the electrical connection.

Furthermore, the attachment of a brake line or of a clip for fastening a brake line can be considered The respective clip can, for example, comprise one or more brake lines and can be fastened by means of a nut to the shaft part of the functional element that can here also have a thread or a thread-like shape. Instead of this, the clip can be simply clipped onto the shaft part of the functional element having latching features such as one or more undercuts or a fir tree shape In both cases, i.e. a shaft part with a thread or having latching features, the forces that emanate from the brake line tend to be low as are also the forces for attaching the clip to the shaft part and for removing the clip from the shaft part of the functional element attached to the sheet metal part. Corrosion is also unwanted here and is also prevented here by the water-tight attachment of the functional element to the sheet metal part.

Furthermore, the attachment of a carpet loop to the shaft part of the functional element attached to the sheet metal part can be considered. Only moderate forces are also used here on the installation or the removal of carpets. Water-tightness is also required here to avoid moist and moldy carpets. Other examples include the attachment of holders and the attachment of a housing of a fixed-vehicle component such as an electrical module or a fuse box In a particularly favorable form of the functional element, the named hollow section comprises a cylindrical part adjacent to the free end of the section and a part that tapers in the direction toward the cylindrical part and that is located between the flange and the cylindrical part. The tapering part brings the advantage that the support and the spreading of the cylindrical part is promoted on the widening, whereby unwanted deformations of the functional element or warping of the sheet metal part can be avoided. Furthermore, the tapering part facilitates the manufacture of the functional element.

The named notches on the tapering part have a reducing radial thickness in the direction moving toward the flange, whereby the outer boundary of the notches extends, for example, in parallel with the longitudinal axis. This design facilitates not only the manufacture of the notches, but rather also stiffens the connection between the functional element and the sheet metal part The inner side of the tapering part and of the cylindrical part of the section are disposed, apart from the region at the free end that has a diverging frustoconical shape, on a circular cylindrical surface. This shape cannot only be manufactured at a favorable cost, but also promotes the technical values of the connection of the functional element to the sheet metal part.

The section at the free end at the transition from the outer side of the cylindrical portion to the region having a diverging frustoconical shape is sharp edged or is provided with a small rounded portion and has a radial thickness for bounding the diverging frustoconical shape at the free end of the cylinder section that amounts to less than 30% of the maximum wall thickness of the cylinder section.

The flange has noses at the side of the named section between the notches, which noses deform the sheet metal material in a wavy manner to achieve additional security against rotation. This design makes it possible to significantly increase the security against rotation without driving up the manufacturing costs The above-described component assembly in accordance with the invention is designed such that the flange has an annular surface that surrounds the shaft part and that is positioned at a spacing in front of the side of the sheet metal part facing the shaft part. This component assembly is particularly suitable for use as a grounding bolt since the annular surface can be kept metallically blank by a screwed-on nut while the penetration of the hollow section of the functional element into the sheet metal part ensures that a low transition resistance is achieved there and can be maintained over a long period of time, particularly since corrosion by liquids at the lower side of the sheet metal part, i.e. at the side of the sheet metal part remote from the functional element, is not to be expected. The exceptionally leak-tight attachment of the functional element in the sheet metal part, i.e. starting from the upper side of the sheet metal part, also prevents corrosion between the hollow section and the sheet metal part there.

In the component assembly, the thickened portion has an indentation at the center at the side remote from the functional element and radially within the widened section. The forces that emanate from a die button having a central elevated portion within the annular recess of the die button produce a good spreading of the named section and thus also excellent mechanical and electrical properties of the component assembly.

In the component assembly in accordance with the invention, the sheet metal material is in intimate engagement with the named recesses in the flange.

The punching forces for attaching the functional element to the sheet metal part are preferably applied to the functional element via a nut that is screwed to the shaft part of the functional element and that contacts an annular surface of the flange. The nut can thus protect and seal the metallically blank annular surface of the functional element during and after the punching process. In this manner, the sheet metal part can be varnished with the attached functional element and the nut without impairing the metallically blank annular surface by varnish application. The nut subsequently only needs to be loosened by a few turns to introduce a fork-like cable eye between the nut and the metallically blank annular surface, after which the nut is tightened again. An electrically high quality connection is hereby achieved between the cable and the sheet metal part.

Figure 1C:
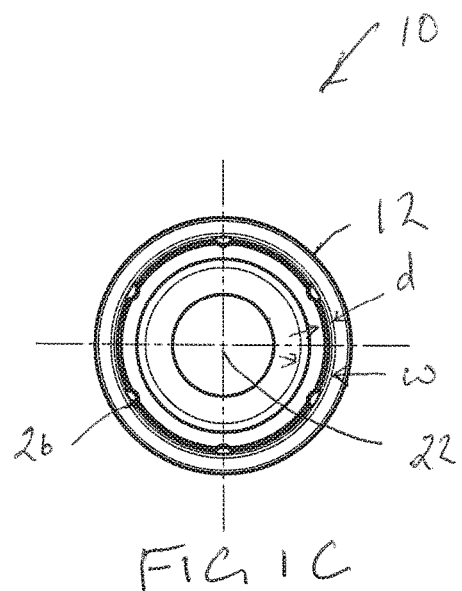
Figure 1D:
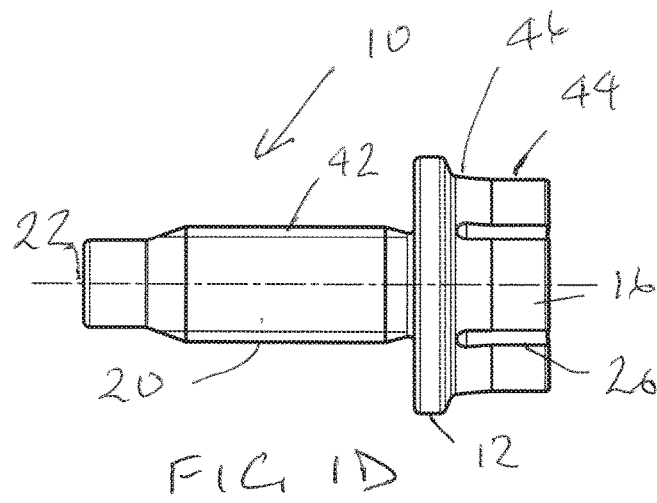
Figure 1E:
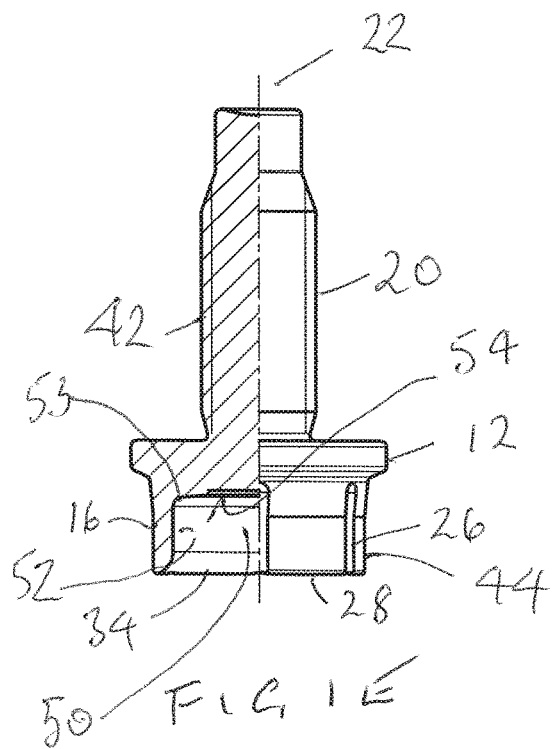
Figure 3A:
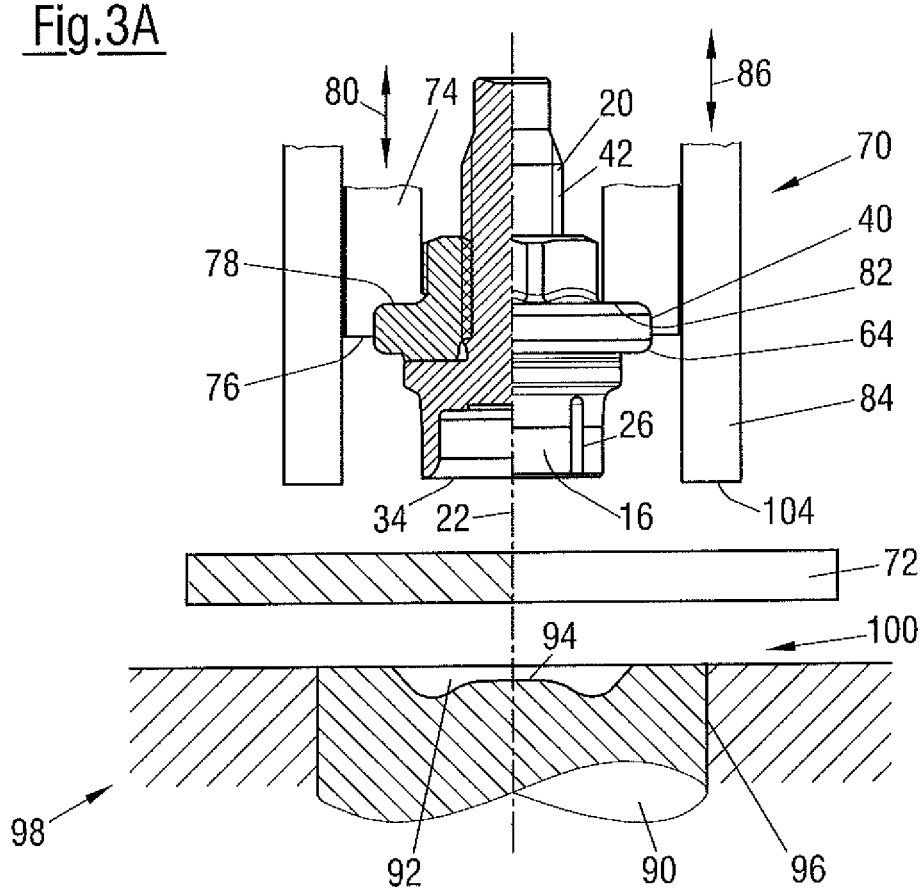
Figure 3B:
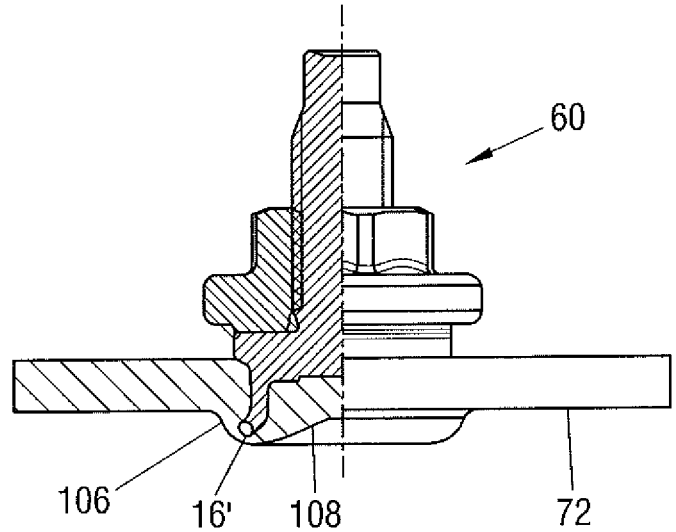
Figure 3C:
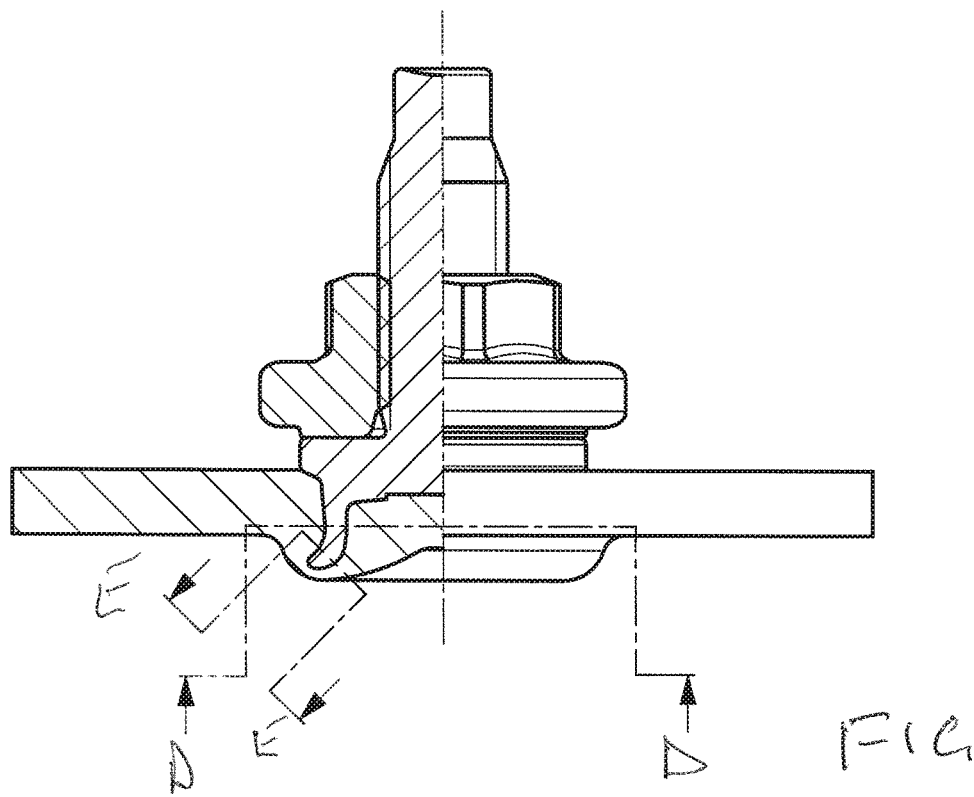
Figure 3D:
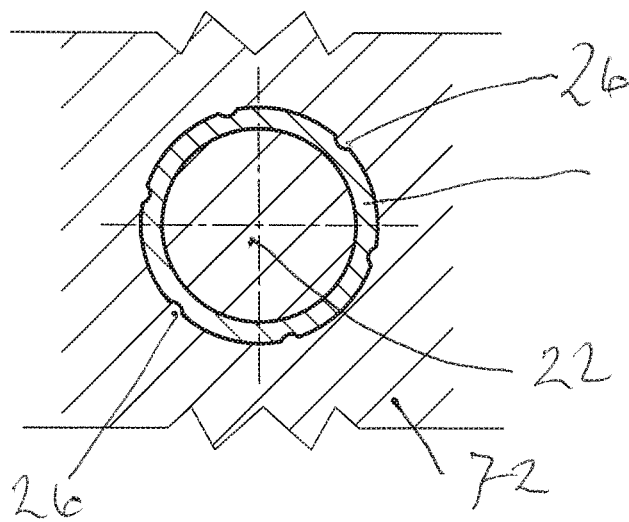
Figure 3E:
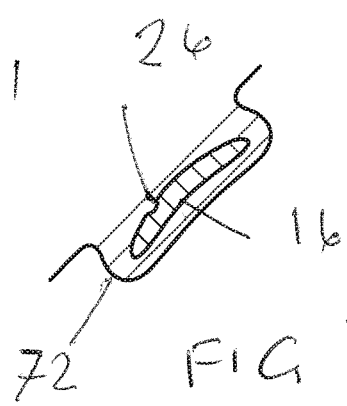
Figure 4A:
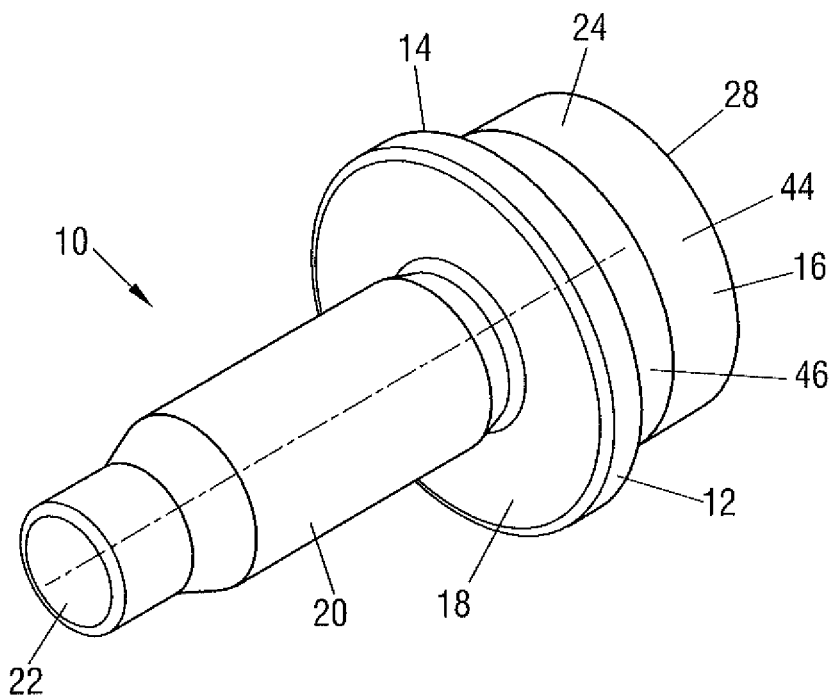
Figure 4B:
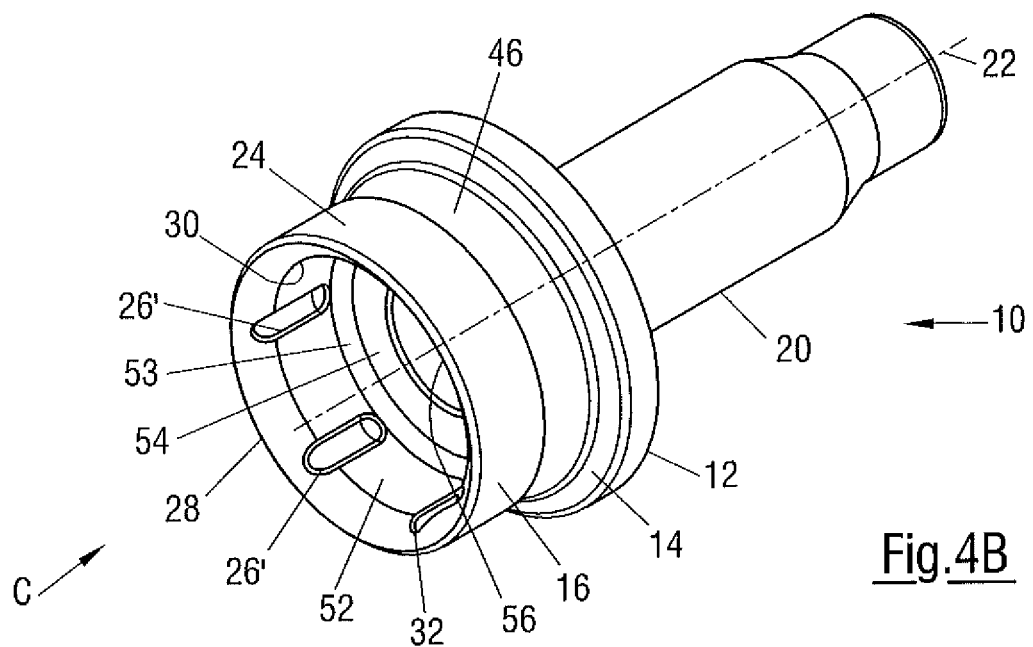
Figure 4C:
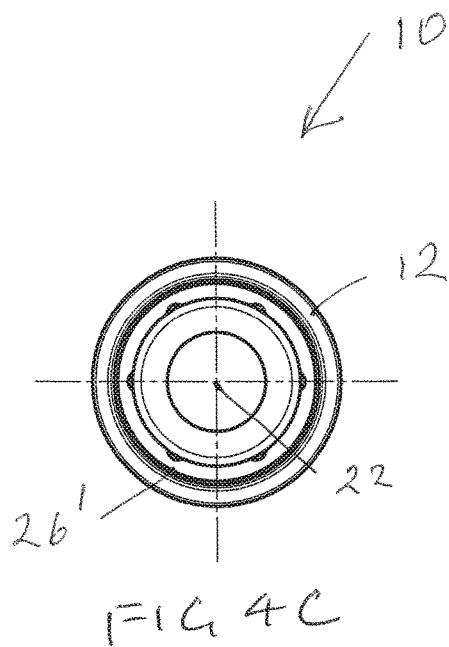
Figure 4D:
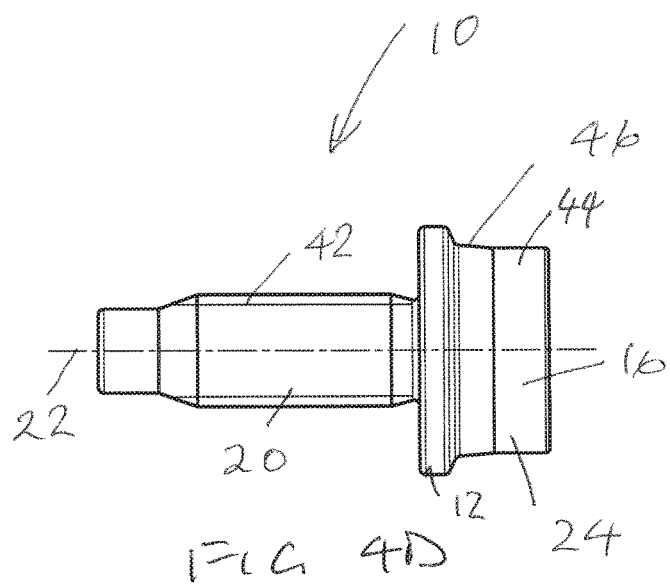
Figure 4E:
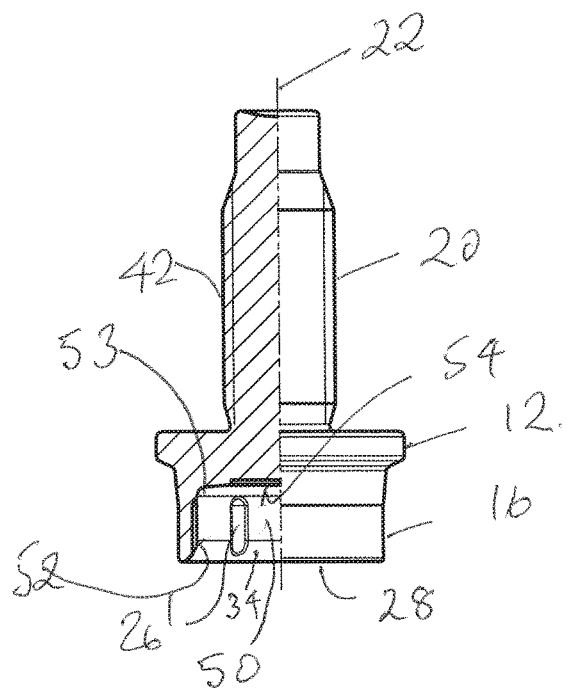
Figure 5A:
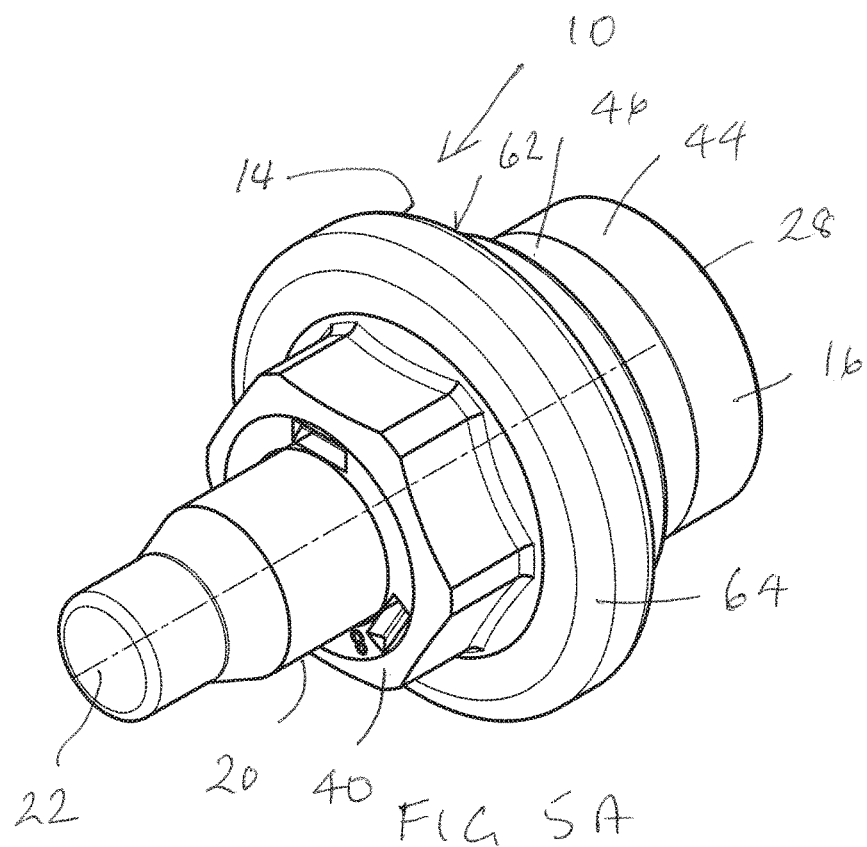
Figure 5B:
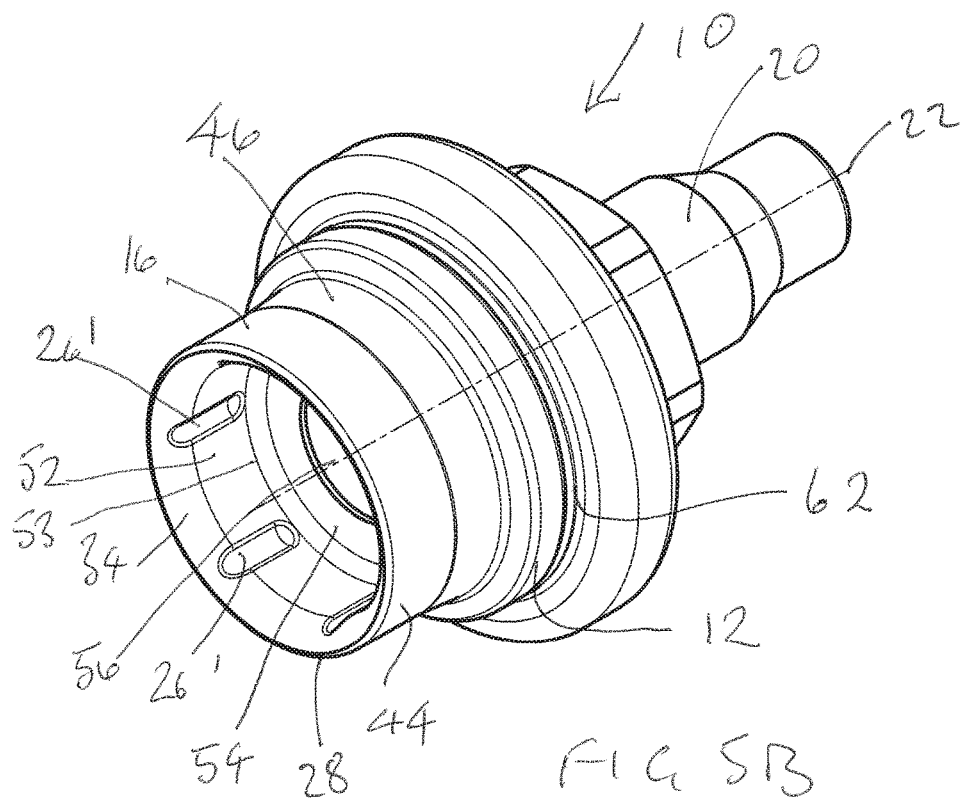
Figure 5C:
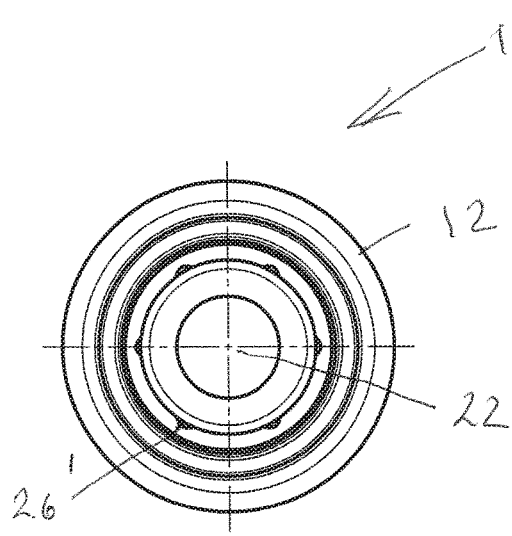
Figure 5D:
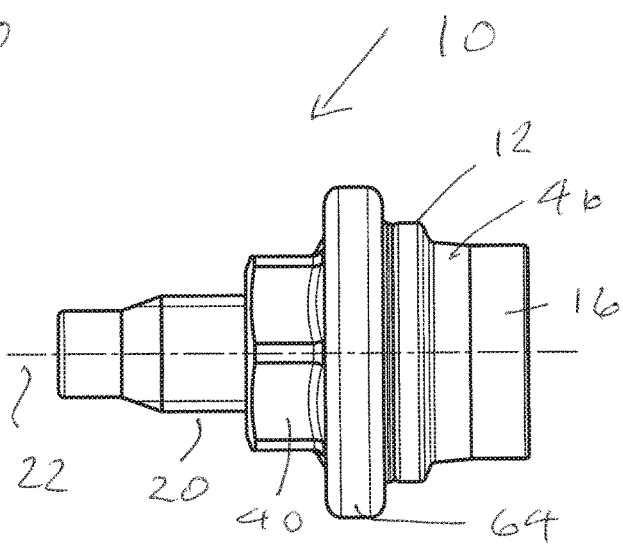
Figure 5E:
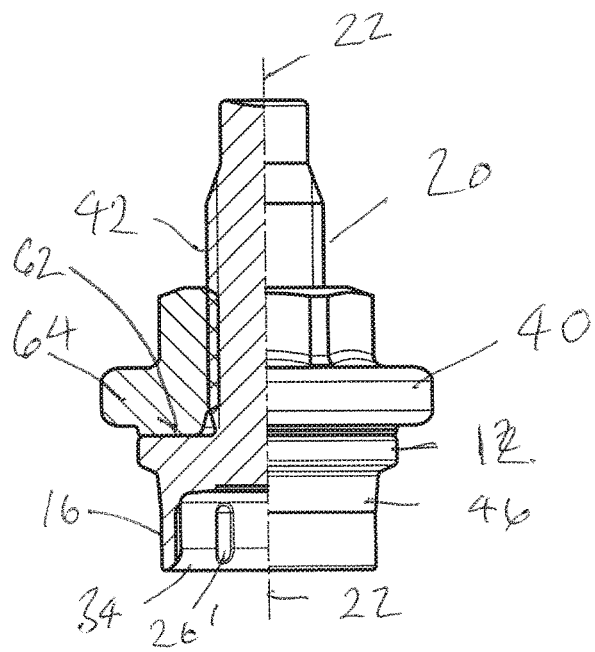

The invention will be described in more detail in the following with reference to embodiments and to the drawings, in which are shown:

FIGS. 1A-1E a representation of a functional element in accordance with the invention having notches at the cylinder section extending in parallel with the longitudinal direction, and indeed in two perspective views (FIGS. 1A and 1B), in an end view (FIG. 1C) in the arrow direction C of FIG. 1B, in a side view (FIG. 1D) and in a view partly sectioned in the longitudinal direction (FIG. 1E);

FIGS. 2A-2E representations corresponding to the representations of FIGS. 1A-1E, but with a nut screwed onto the shaft part of the functional element;

FIGS. 3A-3E five drawings to represent the attachment in accordance with the invention of the functional element in accordance with the invention to a sheet metal part, wherein FIG. 3B shows the completed component assembly in accordance with the invention in a half-section, FIG. 3C corresponds to FIG. 3B, but without reference numerals, but with sectional planes D-D and E-E, FIG. 3D shows a section corresponding to the sectional plane D-D, and FIG. 3E represents a section corresponding to the sectional plane E-E;

FIGS. 4A-4E representations corresponding to FIGS. 1A to 1E, but with notches at the inner jacket surface of the cylindrical section extending in parallel with the longitudinal direction;

FIGS. 5A-5E representations similar to FIGS. 2A to 2E, but for the element corresponding to FIGS. 4A to 4E;

FIGS. 6A-6E representations similar to FIGS. 3A to 3E, but for the element corresponding to FIGS. 4A to 4E;

FIGS. 7A-7E representations corresponding to FIGS. 1A to 1E, but with notches extending in parallel with the longitudinal direction both at the outer jacket surface of the cylindrical section and at its inner jacket surface;

FIGS. 8A-8E representations similar to FIGS. 2A to 2E, but for the element corresponding to FIGS. 7A to 7E; and FIGS. 9A-9E representations similar to FIGS. 3A to 3E, but for the element corresponding to FIGS. 7A to 7E.

Referring to FIGS. 1A to 1E, a functional element 10 is shown having a head part having section 16 that has a flange 12 that projects away from a side 14 of the flange 12 and is designed for penetration-free punching into a sheet metal part and that has a shaft part 20 that projects away from a side 18 of the flange opposite the first side 14 and satisfies a function. The shaft part 20 and the functional element 10 have a longitudinal axis 22, with the flange 12 and the section 16 being arranged at least substantially coaxially to the shaft part 20 The section 16 is designed as a hollow cylinder that has notches 26 at its outer jacket surface 24 extending in parallel with the longitudinal direction or the longitudinal axis. In this embodiment, six such notches 26 are arranged uniformly about the longitudinal axis.

The number of notches is not limited to six; more or fewer notches or grooves can be provided. Fewer than three is probably not very favorable since it would then be difficult to achieve the desired high resistance to rotation. More than twelve notches is probably also unfavorable since the manufacture would be difficult and the desired cylindrical surfaces between the individual notches tend to become small.

The notches 26 have a shape that is rounded in cross-section and that in particular corresponds to a semicircular cross-section.

In the region of its free end face 28, the hollow section 16 has a diverging frustoconical shape 34 at least substantially running out at the free end in a region 32 directly adjacent to the free end 28 of the hollow section at the inner side 30. On the punching into the sheet metal part, this frustoconical shape 34 serves for the widening of the hollow section 16.

It should be emphasized at this point that the region 32 does not necessarily have to have a strictly frustoconical shape, but can rather also have an arched surface, a trumpet-like shape or a different shape. It is only important that the region 32 has an increasingly diverging shape in a direction going from the flange 12 to the free end 28.

In this example, the functional element 10 is designed for the attachment of a nut 40 (FIGS. 2A-2E) for fastening a connection terminal (not shown) and has a threaded cylinder 42 for this purpose. However, this design is not absolutely necessary. The shaft part 20 can instead, for example, be designed for carrying out one of the following functions:
attaching a brake line or a clip or fastening a brake line;
attaching a carpet loop;
attaching a holder; and
attaching a housing of a fixed-vehicle component in which no special demands are made on the strength of the connection, i.e. not for attaching safety-related components.

As can be seen from the Figures, the named hollow section 16 comprises a cylindrical part 44 adjacent to the free end 28 of the section and a part 46 that tapers in the direction toward the cylindrical part 44 and that is arranged between the flange 12 and the cylindrical part 44, with the named notches 26 having a reducing radial depth in the direction moving toward the flange at the tapering part. The inner side 50 of the tapering part 46 and of the cylindrical part 44 of the hollow section 16 is disposed at a circular cylindrical surface 52, with the exception of the region 32 at the free end 28 that has a diverging frustoconical shape 34. The inner side 50 merges, adjacent to the side 14 of the flange 12 via a rounded portion 53 into a base region 54 that preferably has a central indentation 56 This indentation 56 which is circular in a plan view is favorable from a technical manufacturing aspect and can serve as a buffer space on the punching into the sheet metal part The hollow section 16 is sharp-edged or is provided with a small rounded portion at the free end 28 at the transition from the outer side of the cylindrical part 44 to the region 32 having a diverging frustoconical shape 44 and has a radial thickness "d" for bounding the diverging frustoconical shape 34 at the free end of the cylinder section 44 that is normally, but not necessarily, less than 30% of the maximum wall thickness "w" of the cylindrical section 44 (i.e. calculated without the radial thickness of the notches 26).

Figure 2A:
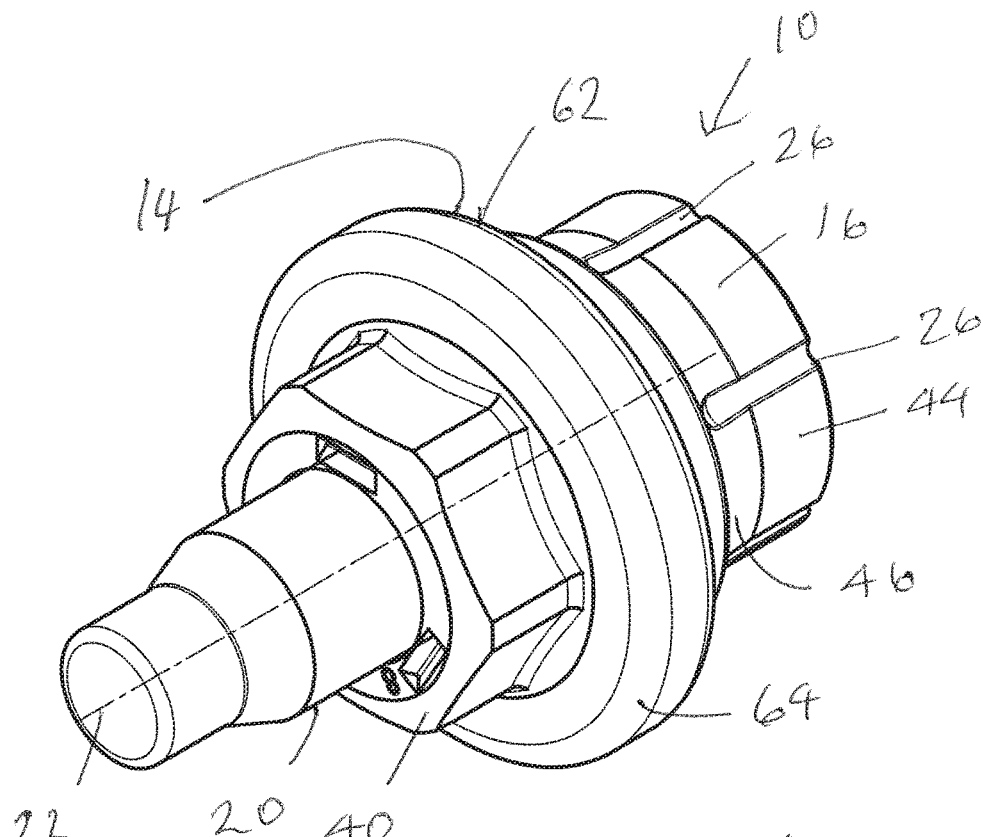
Figure 2B:
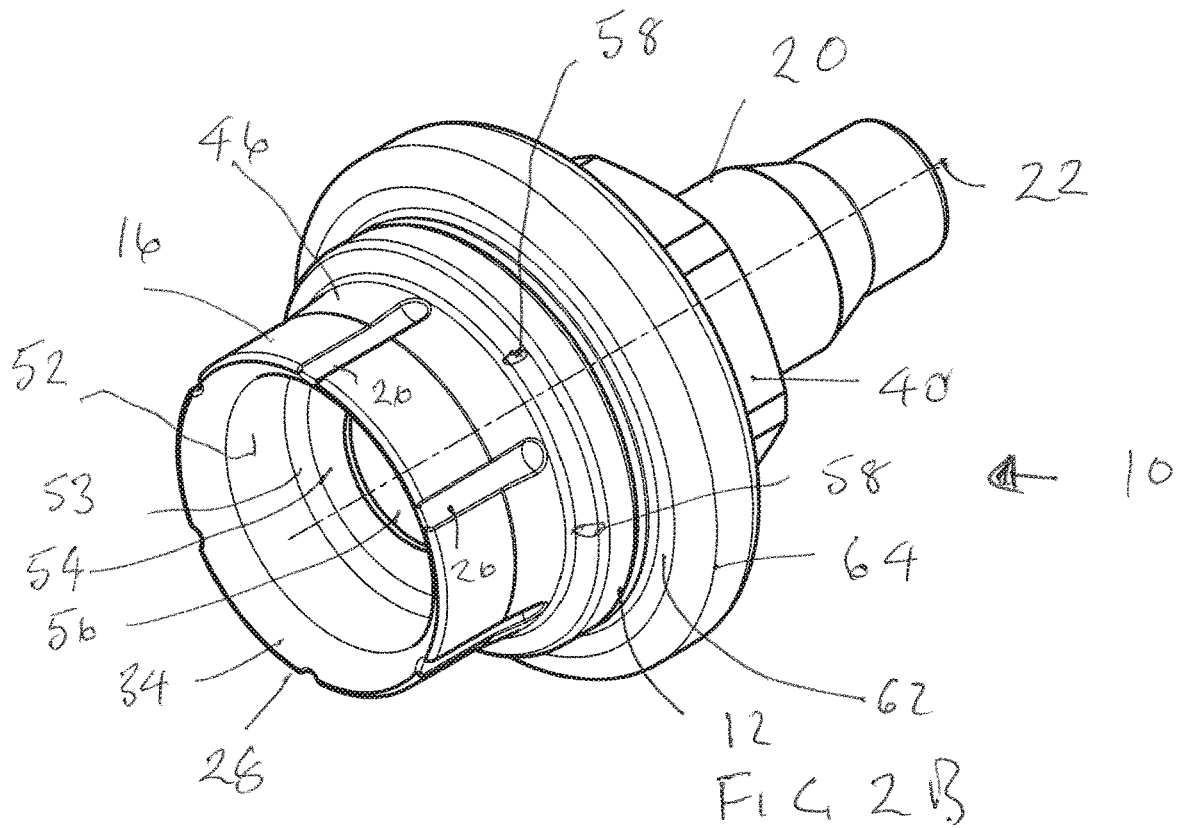
Figure 2C:
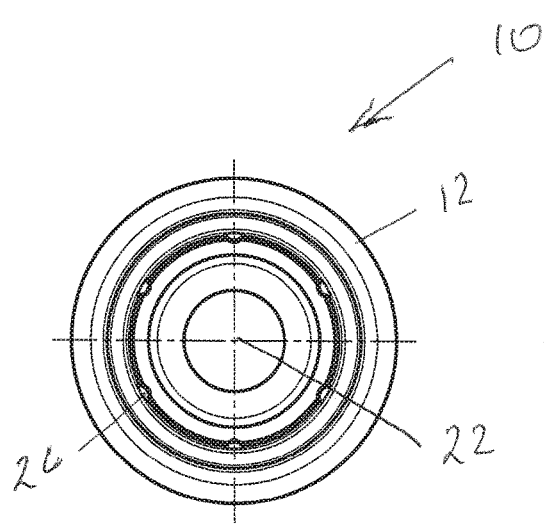
Figure 2D:
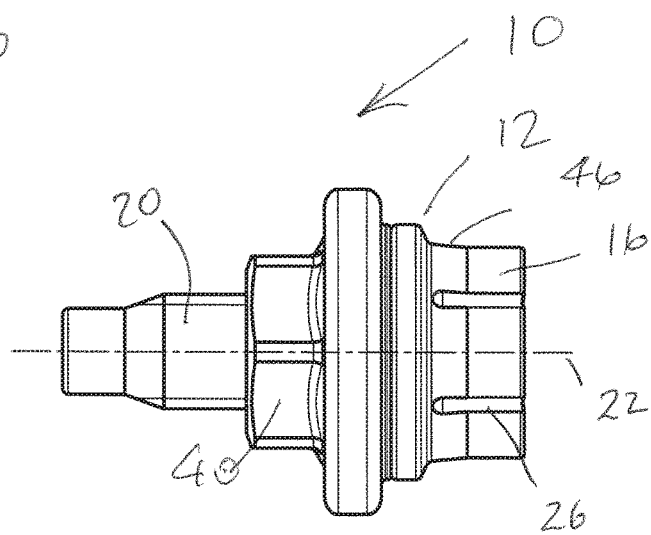
Figure 2E:
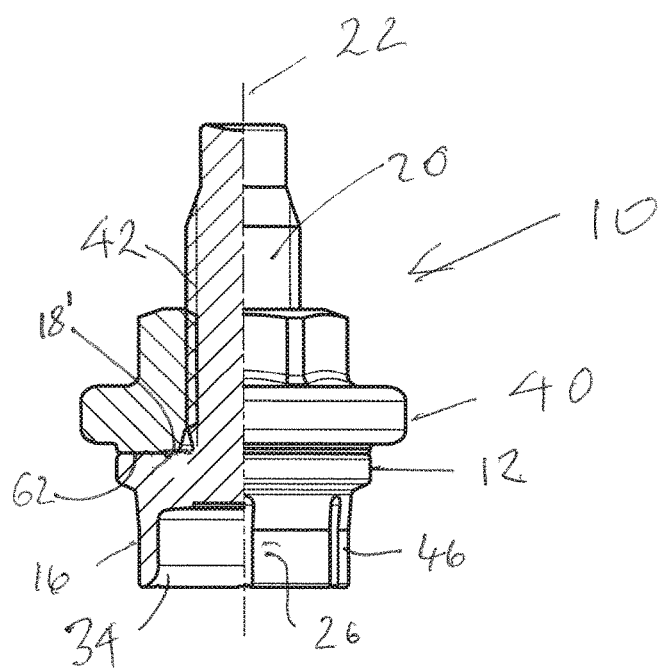

Furthermore, the flange 22 can have noses 58 at the side 14 of the named hollow section 12 between the notches 26 (FIG. 2B, which noses, in accordance with FIG. 3B, can deform the sheet metal material in a wave-like manner for achieving additional security against rotation in the finished component assembly 60.

In the examples that are shown in the drawings, the shaft part 20 is—as already explained—provided with a thread 42 for screwing on a nut 40 The side 62 of the nut 40 facing the flange 22 that is designed as a flange nut with a flange 64 is in principle perpendicular to the central longitudinal axis 22 of the functional element and seals toward the metallically blank annular contact surface of the flange 12 that surrounds the shaft part. It can however be favorable to form the contact surface 62 of the flange nut facing the flange 12 (see FIG. 2E) or the annular surface 18' of the flange (that is formed at the side 18 of the flange) as a shallow conical surface, i.e. with an included cone angle of just less than 180°, so that a tight sealing ring is created radially outwardly at the annular surface 18'. The annular surface 18' could instead be provided with such a conical angle.

The preferred method for the manufacture of a component assembly 60 by punching in the functional element 10 will now be described, and indeed with reference to FIGS. 3A and 3B. FIG. 3A shows the functional element 10 having a screwed on flange nut 40 in accordance with FIGS. 2A to 2E in a setting head or in a punching head 70 above a non-pierced sheet metal part 72. Such setting heads or punching heads 70 are very well known in the field of functional elements. They generally have a hollow plunger 74 that is formed at its lower end 76 with a mount 74 for receiving a functional element. The plunger 72 is movably arranged in accordance with the double arrow 80 in the punching head 70 and can be moved into an upper position in which a functional element 10, here with a screwed on nut 40, can be brought through a guide channel (not shown) beneath the plunger 72. The plunger 72 is subsequently moved downwardly until the hexagonal region of the nut 40 above the flange is located within the hollow plunger and the surface of the mount 78 of the plunger 72 facing the upper side 82 of the flange 64 contacts this upper side 82 of the flange 64 of the flange nut 40. A cylindrical downholder 84, that is movably supported in accordance with the double arrow 86 and that is likewise only shown schematically, is located around the plunger 74.

A die button 90 having a central recess 92 and having a central elevated portion 94 rounded at the top at the center of this recess 92 is located beneath the sheet metal part 72. Both the recess 92 and the elevated portion 94 are of circular shape in a plan view, i.e. are arranged rotationally symmetrically relative to the central longitudinal axis 22 of the functional element. The die button is located in a corresponding opening 96 of a lower tool 98, with the annular sheet metal contact surface 100 of the die button being flush area-wise with the upper side 102 of the lower tool 98.

In many cases the setting head 70 is attached to an upper tool of a press (not shown) or to an intermediate tool of a press, whereas the lower tool 98 represents the lower tool of the press. A respective functional element 10, in this example with a screwed-on nut 40, is punched into the sheet metal part by means of the punching head 70 and the die button 90 for every stroke of the press. If the nut 40 should not be used for punching in the functional element, the plunger 74 can press directly toward the annular surface 18' of the functional element.

On the closing of the press, the spring pre-loaded downholder 84 is urged toward the sheet metal part until its lower end face 104 clamps the sheet metal part 72 between it and the annular surface 100 of the die button. On the further closing of the press, the plunger 74 urges the functional element 10 with the nut downwardly until the free end of the hollow section 16 contacts the upper side of the sheet metal part 72 and starts to displace the sheet metal material beneath the hollow section 16. On a progressive downwardly directed movement of the punching head 70, sheet metal material is urged into the mount 92 of the die button 90 and forms the thickened portion of the sheet metal part that is marked by 106 in FIG. 3B. During this movement, the contact of the frustoconical shape 34 of the hollow section and the pressure that emanates from the elevated portion 94 results in a downwardly diverging shape 16' of the hollow section 16 of the functional element 10. In this respect, the sheet metal material is introduced into the hollow space of the hollow section and presses toward the inner side 50 of the hollow section 16', whereby the hollow section 16' is stiffened from the inside. It can be seen from FIG. 3B that the end face 28 of the hollow section 16' does not project through the lower side of the sheet metal part 72, i.e. does not penetrate it, whereby a fluid-tight attachment of the functional element 10 to the sheet metal part has taken place. In this respect, the sheet metal material penetrates into the longitudinal notches and thus generates security against rotation. If noses 58 are to be provided, sheet metal material is deformed in a wave-like manner in the flange region and increases the security against rotation value accordingly. Since the hollow section 16' has a spread apart shape, the functional element is secured against pulling-out forces that attempt to pull the functional element out of the sheet metal part 72. Since the flange 12 contacts the sheet metal part 72 over the full area and has preferably penetrated partly into it, a good buttoning out resistance is also achieved. The thickened portion 106 also creates room for the accommodation of the hollow section 16'.

The thickened portion 106 has an indentation 108, that has a shape complementary to that of the elevated portion 94 of the die button 90, at the center at the side remote from the functional element 10 and radially within the widened section 16'.

Although the method has been described here in the sense of the orientation of the functional element 10 in FIGS. 3A and 3B, this orientation is by no means absolutely necessary. For example, the punching head 70 could be arranged facing upwardly in the lower tool of the press or likewise facing upwardly in the intermediate plate of the press, while the die button is then arranged facing downwardly in the intermediate plate of the press or in the upper tool of the press. The designations "upward" and "downward" or similar designations are to be understood in accordance with the geometrical arrangement of FIGS. 3A and 3B and should not be interpreted as restrictive. In another respect, oblique positions of the punching head 70 and of the die button 90 are also possible.

It is also not absolutely necessary to carry out the attachment of the functional element in a press. This can also take place—without restriction—by means of a robot that presses the functional element toward a die button supported at a die button or by means of a pair of tongs or in a C frame. Systems known per se for the automatic attachment of half-hollow piercing rivets for the attachment of the functional elements in accordance with the invention can also be considered.

The method described here thus comprises the following steps:

arranging the sheet metal part 72 at a die button 90 having a central recess 92, wherein the size of the opening of the recess 92 determines the diameter of the thickened portion 106 and the depth of the recess 92 determines the height of the thickened portion 106, wherein the die button preferably has a central elevated portion 94 within the recess;

pressing the functional element 10 with the free end 28 of the hollow section 16 at the front toward the side of the sheet metal part 72 remote from the die button 90 and pressing the hollow section 16 into the sheet metal material, whereby the diverging frustoconical shape 34 of the section is optionally widened in combination with a central elevated portion 94 of the recess 92 of the die button 90 and the sheet metal material is brought into engagement with the jacket surface of the named section 16 and with the notches 26 provided there and within the hollow section 16, displacing the sheet metal material by the named section 16 using the punching forces into the recess 92 of the die button 90 and forming the named thickened portion 106 and optionally the named indentation 108; and optionally, partly pressing the side 14 of the flange 12 facing the section plus any features providing security against rotation 58 present there into the side of the sheet metal part 72 remote from the die button 90.

In this respect, the punching forces are preferably applied to the functional element 10 via a nut 40 that is screwed to the shaft part 20 of the functional element 10 and that contacts an annular surface 18' of the flange 12.

The flange nut 40 can, as explained in more detail above, be used for the punching in of the functional element.

The result of the method is the component assembly 60 that is shown in FIG. 3B comprising the sheet metal part 72 and the functional element 10 attached thereto. It is particularly important that the sheet metal part 72 has a thickened portion 106 in the region of the attached functional element 10 in comparison with the sheet metal part thickness radially outside the attached functional element. The hollow section 16 is widened in the region of the thickened portion 106 and at the free end and is received in a shape matched manner in the sheet metal part 72 without penetrating the sheet metal part. Sheet metal material is located within the widened section and outside the section in engagement with the section 16' and with the longitudinal notches 26.

The annular surface 18' of the flange 12 that surrounds the shaft part 20 is located at a spacing in front of the side of the sheet metal part 72 facing the shaft part.

The cylindrical section 16 acts so-to-say as a piercing rivet and can be understood as a rivet section, particularly since the section is deformed on the attachment to the sheet metal part, which by definition applies to a rivet section.

The same reference numerals as in the just described embodiment in accordance with FIGS. 1 to 3 are used in the further embodiments in accordance with FIGS. 4 to 9. The reference numerals indicate parts that have the same form or function as described in connection with FIGS. 1 to 3 unless something to the contrary is said. The description will thus not be unnecessarily repeated.

It should only be expressed that, in the embodiment in accordance with FIGS. 4 to 6, the notches 26' extending in parallel with the longitudinal direction are provided at the inner jacket surface 52 of the hollow cylindrical section 16 instead of at the outer jacket surface of the cylindrical section.

In the embodiment in accordance with FIGS. 7 to 9, notches 26' extending in parallel with the longitudinal direction are provided both at the outer jacket surface of the cylindrical section 16 and at the inner jacket surface 52 of the hollow cylindrical section, wherein the notches 26' at the inner jacket surface 52 of the hollow cylindrical section 16 are offset angle-wise with respect to the notches 26 at the outer jacket surface to avoid a pronounced weakening of the wall of the hollow cylindrical section 16.

As explained above, the number of notches in all the embodiments is not restricted to six; more or fewer notches or grooves can be provided. If notches are provided at the inner jacket surface and at the outer jacket surface of the cylindrical section 16, their number at the inner jacket surface should preferably be the same as their number at the outer jacket surface to ensure the offset arrangement.

The functional element can comprise the same material that is normally used for half-hollow punch rivets or can comprise materials that are used for the production of screws of quality class 4.6 or 8.8 (or higher) according to DIN by means of cold working.

In all the embodiments, the movement of the sheet metal material into the notches 26 and 26' or 26, 26' takes place by cold working that is produced when the sheet metal material is squeezed between the setting punch and the die button.

REFERENCE NUMERAL LIST

10 functional element
12 flange
14 side
16 section
16' diverging shape of the hollow section 16
18 side
18' annular surface
20 shaft part
22 longitudinal axis
24 jacket surface
26 notches
28 end
30 inner side
32 region
34 frustoconical shape
40 nut
42 threaded cylinder
44 cylindrical part
46 tapering part
50 inner side
52 circular cylindrical surface
53 rounded portion
54 base region
56 indentation
58 noses
60 component assembly
62 side
64 flange
70 punch head
72 sheet metal part
74 plunger
76 end
78 mount
80 double arrow
82 upper side
84 downholder
86 double arrow
90 die button
92 recess
94 elevated portion
96 opening
98 tool
100 sheet metal contact surface
102 upper side
104 end face
106 thickened portion
108 indentation

The invention claimed is:

1. A functional element (10) having a section (16) that has a flange (12), that projects away from a side (14) of the flange (12), and that is adapted for an aperture-free punching into a sheet metal part (72) and having a shaft part (20) that projects away from a side (18) of the flange (12) opposite the first side (14), that satisfies a function, and that has a longitudinal axis (22), wherein the flange (12) and the section (16) are arranged at least substantially coaxially to the shaft part (20), wherein the section (16) is configured as a hollow cylinder that has notches (26 and 26') extending in parallel with the longitudinal direction at at least one of its outer jacket surface and its inner jacket surface and the section (16) has a diverging frustoconical shape (34) that runs out at least substantially at the free end (28) and that serves for the widening of the section (26) on the punching into the sheet metal part in the region of its free front 20 end (28) on the inner side preferably in a region (32) directly adjacent to the free end (28) of the section.

2. A functional element in accordance with claim 1, wherein the notches (26, 26') have a shape that is rounded in cross-section and that in particular corresponds to a semicircular cross-section.

3. A functional element in accordance with claim 1, wherein the shaft part (20) is adapted to carry out one of the following functions: attaching a connection terminal or a nut for fastening a connection terminal;
attaching a brake line or a clip for fastening a brake line; attaching a carpet loop; attaching a holder; and attaching a housing of a fixed-vehicle component in which no special demands are made on the strength of the connection, i.e. not for attaching safety-related components.

4. A functional element in accordance with claim 1, wherein the said hollow section (16) comprises a cylindrical part (44) adjacent to the free end (28) of the section (16) and a part (46) tapering in the direction toward the cylindrical part (44) between the flange (12) and the cylindrical part (44).

5. A functional element in accordance with claim 4, wherein the said notches (26) have a reducing radial depth on the tapering part (46) moving toward the flange (12), whereby the outer boundary (48) of the notches (26) extends in parallel with the longitudinal axis (22), for example.

6. A functional element in accordance with claim 4, wherein the inner side (50) of the tapering part (46) and of the cylindrical part (44) of the section (16) is disposed at a circular cylindrical surface, with the exception of the region (32) at the free end (28) that has a diverging frustoconical shape (34).

7. A functional element in accordance with claim 1, wherein the section (16) is sharp edged or is provided with a small rounded portion at the free end at the transition from the outer side of the cylindrical part (44) with respect to the region having a diverging frustoconical shape (34) and has a radial depth (d) for bounding the diverging frustoconical shape (34) at the free end of the cylinder section that amounts to less than 30% of the maximum wall thickness (w) of the cylinder section (44).

8. A functional element in accordance with claim 1, wherein the flange (12) has noses (58) that receive sheet material for achieving additional security against rotation at the side (14) of the named section (16) between the notches (26).

9. A functional element in accordance with claim 1, wherein it is present with a nut (40) that is screwed to the shaft part (20) and seals a metallically blank annular surface (18') of the flange (12) that surrounds the shaft part (20).

10. A component assembly (60) comprising a sheet metal part (72) and a functional element (10) in accordance with claim 1, wherein the sheet metal part (72) has a thickened portion (106) in the region of the attached functional element (10) in comparison with the sheet metal part thickness radially outside the attached functional element (10), wherein the named section (16) is received with shape matching in a widened form (16') without penetrating the sheet metal part (72) in the region of the thickened portion (106) and at the free end, and wherein the sheet metal material is in engagement with the widened section (16') both outside the widened section (16') and within it and is also in engagement with the notches (26, 26'), whether outside or inside the widened section (16') or both outside and inside the named section.

11. A component assembly in accordance with claim 10, wherein the flange (12) has an annular surface (18') that surrounds the shaft part (20) and that is at a spacing in front of the side of the sheet metal part (72) facing the shaft part (20).

12. A component assembly in accordance with claim 10, wherein the thickened portion (106) has an indentation (108) at the center at the side remote from the functional element (10) and radially within the widened section.

13. A component assembly in accordance with claim 10, wherein the sheet metal material is in engagement with noses (58) provided at the flange (12).

\* \* \* \* \*